US007007019B2

(12) United States Patent
Kanno

(10) Patent No.: US 7,007,019 B2
(45) Date of Patent: Feb. 28, 2006

(54) VECTOR INDEX PREPARING METHOD, SIMILAR VECTOR SEARCHING METHOD, AND APPARATUSES FOR THE METHODS

(75) Inventor: Yuji Kanno, Tokyo (JP)

(73) Assignee: Matsushita Electric Industrial Co., Ltd., (JP)

(*) Notice: Subject to any disclaimer, the term of this patent is extended or adjusted under 35 U.S.C. 154(b) by 928 days.

(21) Appl. No.: 09/913,960

(22) PCT Filed: Dec. 21, 2000

(86) PCT No.: PCT/JP00/09079

§ 371 (c)(1),
(2), (4) Date: Aug. 21, 2001

(87) PCT Pub. No.: WO01/46858

PCT Pub. Date: Jun. 28, 2001

(65) Prior Publication Data

US 2002/0178158 A1 Nov. 28, 2002

(30) Foreign Application Priority Data

Dec. 21, 1999 (JP) ................................ 11-363058

(51) Int. Cl.
*G06F 17/30* (2006.01)

(52) U.S. Cl. .................................. 707/5; 707/3; 707/4

(58) Field of Classification Search .................... 707/3, 707/4, 5, 10
See application file for complete search history.

(56) References Cited

U.S. PATENT DOCUMENTS 4,837,632 A * 6/1989 Kubo et al. .............. 348/208.6
5,647,058 A * 7/1997 Agrawal et al. ............... 707/1
5,706,497 A * 1/1998 Takahashi et al. ............. 707/5
5,819,288 A * 10/1998 De Bonet ....................... 707/2
5,987,446 A * 11/1999 Corey et al. ................... 707/3
6,334,129 B1 * 12/2001 Kiyoki et al. .................. 707/5
6,404,925 B1 * 6/2002 Foote et al. ................ 382/224
6,574,632 B1 * 6/2003 Fox et al. .................. 707/102

OTHER PUBLICATIONS

Kim et al. (An index-based approach for similarity search supporting time warping in large sequence databases) (Data Engineering, 2001. Prceedings. 17th International Conference). Date (Apr. 2, 2001-Apr. 6, 2001). p. 607-614.*

(Continued)

*Primary Examiner*—Alford Kindred
*Assistant Examiner*—Baoquoc N To

(74) *Attorney, Agent, or Firm*—Connolly Bove Lodge & Hutz LLP

(57) ABSTRACT

In the present invention, a similar vector is searched from a several hundreds dimensional vector database at a high speed, by a single vector index, and in accordance with either measure of an inner product or a distance by designating a similarity search range and maximum obtained pieces number, vector index preparation is performed by decomposing each vector into a plurality of partial vectors and characterizing the vector by a norm division, belonging region and declination division to prepare an index, and similarity search is performed by obtaining a partial query vector and partial search range from a query vector and search range, performing similarity search in each partial space to accumulate a difference from the search range and to obtain an upper limit value, and obtaining a correct measure from a higher upper limit value to obtain a final similarity search result.

29 Claims, 29 Drawing Sheets

OTHER PUBLICATIONS

Tolga et a. (Indexing large metric spaces for similarity search queries), Sep. 1999, ACM, vol. 24, Issue 3, p. 361-404.*

Keogh, et al. (An Indexing Scheme for Fast Similarity Search in Large Time Series Databases), Jul. 28, 1999, IEEE, pp. 56 67.*

* cited by examiner

F I G. 1 2 A

| | | | | | | | | | | |
|---|---|---|---|---|---|---|---|---|---|---|
| 1 | +0.029259 | -0.016005 | -0.021118 | +0.024992 | -0.006860 | -0.009032 | -0.007255 | -0.007715 | -0.025648 | +0.016061 |
| | -0.060584 | -0.013593 | -0.020985 | -0.112403 | -0.012045 | +0.044741 | +0.026761 | +0.078339 | +0.048166 | +0.043434 |
| | +0.100093 | +0.009913 | +0.085770 | +0.101257 | +0.072163 | -0.066119 | +0.059376 | -0.020159 | +0.051960 | -0.129138 |
| | -0.028065 | +0.027535 | +0.028316 | +0.050490 | +0.015931 | -0.040316 | -0.013109 | -0.014728 | -0.004639 | -0.021525 |
| | -0.000471 | -0.033506 | +0.013866 | -0.054646 | +0.067350 | +0.042063 | +0.041963 | -0.006444 | -0.092581 | +0.004488 |
| | +0.004741 | +0.009351 | +0.038429 | -0.042254 | -0.027641 | -0.068727 | +0.037185 | -0.003393 | -0.040649 | +0.013169 |
| | +0.020619 | +0.025594 | -0.019990 | -0.117804 | +0.005791 | -0.027860 | +0.000220 | -0.038765 | -0.029964 | +0.020038 |
| | +0.032435 | -0.027518 | -0.063942 | +0.085381 | +0.038776 | +0.051395 | +0.004047 | +0.092011 | -0.076222 | +0.096729 |
| | -0.018331 | +0.115754 | -0.038478 | +0.131147 | -0.074560 | +0.080634 | -0.186932 | +0.024004 | +0.047046 | -0.075571 |
| | +0.121789 | -0.055221 | -0.001166 | -0.053469 | -0.086326 | +0.011837 | -0.060801 | +0.222437 | -0.055550 | -0.117881 |
| | -0.020700 | -0.028172 | -0.121642 | -0.160389 | +0.147645 | -0.037681 | -0.057998 | +0.104025 | +0.251415 | -0.029438 |
| | +0.030504 | -0.048312 | -0.072984 | -0.088780 | +0.041684 | +0.127138 | +0.061804 | +0.064147 | -0.016586 | +0.024305 |
| | +0.060558 | -0.004070 | +0.094040 | -0.011500 | +0.000545 | +0.083231 | +0.016565 | +0.081034 | +0.073438 | -0.006857 |
| | -0.008995 | +0.023537 | +0.066849 | -0.035310 | +0.005572 | -0.015236 | +0.109983 | -0.185597 | +0.016643 | +0.032632 |
| | -0.075726 | -0.110307 | +0.038577 | +0.038475 | -0.042287 | +0.082878 | +0.035997 | -0.009888 | +0.081286 | +0.063583 |
| | -0.041429 | +0.025969 | -0.040406 | +0.005639 | +0.032087 | +0.007947 | +0.041689 | +0.040077 | +0.067726 | -0.101670 |
| | -0.091183 | +0.167914 | -0.080320 | +0.049351 | +0.069409 | +0.063139 | -0.038358 | -0.126212 | +0.058109 | +0.031847 |
| | -0.014998 | -0.022995 | +0.054876 | +0.033124 | -0.065283 | -0.058574 | +0.049729 | -0.046552 | +0.042485 | -0.006179 |
| | -0.058764 | +0.079383 | +0.000817 | -0.001482 | -0.036410 | -0.036097 | -0.045920 | -0.001729 | +0.039971 | +0.083165 |
| | -0.023112 | +0.014492 | +0.028403 | +0.047480 | +0.038502 | +0.028348 | +0.055128 | +0.045340 | -0.066148 | +0.018156 |
| | -0.008535 | -0.042836 | +0.006119 | -0.037691 | +0.018055 | +0.035741 | -0.023394 | +0.012401 | -0.070880 | +0.010066 |
| | -0.013264 | -0.031192 | -0.064061 | -0.026757 | -0.028246 | +0.078634 | +0.013295 | +0.011129 | +0.028807 | +0.012339 |
| | +0.007173 | -0.008856 | +0.040397 | +0.039853 | +0.085247 | -0.053102 | +0.052307 | +0.065223 | +0.116747 | +0.013464 |
| | -0.004875 | +0.019186 | +0.024114 | -0.056101 | -0.024008 | +0.061251 | -0.043466 | -0.017640 | +0.081001 | -0.014824 |
| | -0.003836 | +0.059081 | +0.051690 | -0.032798 | +0.039059 | +0.020370 | +0.015096 | +0.051693 | +0.015507 | -0.041601 |
| | -0.000192 | -0.065087 | +0.018487 | -0.040415 | +0.036173 | -0.011809 | +0.010862 | +0.005944 | +0.028534 | -0.031335 |
| | +0.023075 | +0.033037 | +0.063589 | +0.014185 | +0.006539 | +0.002593 | -0.023986 | -0.038277 | -0.009555 | -0.018987 |
| | +0.052526 | +0.035448 | +0.013042 | +0.023662 | +0.011775 | -0.055742 | -0.008120 | -0.040546 | -0.023508 | -0.069309 |
| | +0.037886 | +0.041494 | -0.038487 | -0.035241 | +0.020432 | -0.008060 | +0.002984 | +0.070241 | +0.069379 | +0.020206 |
| | +0.032996 | +0.047815 | +0.046106 | +0.001794 | +0.035342 | -0.003895 | | | | |

FIG. 12B

| | | | | | | | | | | |
|---|---|---|---|---|---|---|---|---|---|---|
| 2 | +0.028972 | -0.012757 | -0.015597 | +0.019727 | +0.009386 | -0.016593 | +0.003627 | +0.006288 | -0.019184 | +0.020306 |
| | -0.057163 | -0.017815 | -0.026345 | -0.102036 | +0.002587 | +0.037785 | +0.029168 | +0.076061 | +0.043901 | +0.040040 |
| | +0.123462 | +0.001139 | +0.085437 | +0.108889 | +0.052652 | -0.048914 | +0.060612 | -0.005019 | +0.030421 | -0.153633 |
| | -0.041444 | +0.038908 | +0.006823 | +0.069954 | +0.028216 | -0.043207 | -0.030092 | +0.013753 | +0.023770 | -0.018313 |
| | +0.008825 | -0.036443 | +0.001076 | -0.067721 | +0.046034 | +0.030717 | +0.017880 | -0.036936 | -0.093124 | -0.000883 |
| | +0.027865 | +0.007906 | +0.005978 | -0.024367 | -0.012682 | -0.054200 | +0.025934 | +0.000926 | -0.047710 | +0.009757 |
| | +0.005940 | +0.020855 | -0.070890 | -0.113381 | +0.004988 | -0.038150 | -0.000456 | -0.024836 | -0.007560 | +0.025912 |
| | +0.009004 | -0.053047 | -0.079142 | +0.085440 | +0.027876 | +0.051104 | +0.016944 | +0.082277 | -0.071359 | +0.107308 |
| | +0.005041 | +0.112418 | -0.009138 | +0.119492 | -0.069016 | +0.123591 | -0.166734 | +0.032382 | +0.005430 | -0.030192 |
| | +0.116327 | -0.077304 | +0.003280 | -0.006984 | -0.055858 | +0.022018 | -0.110375 | +0.197565 | -0.038060 | -0.085170 |
| | -0.065823 | -0.021350 | -0.104387 | -0.147696 | +0.111377 | -0.028678 | -0.097095 | +0.064212 | +0.255376 | -0.011000 |
| | +0.020901 | -0.032671 | -0.092765 | -0.063843 | +0.008917 | +0.106446 | +0.070094 | +0.078741 | -0.012886 | -0.003581 |
| | +0.069363 | +0.021164 | +0.046900 | -0.021002 | -0.008879 | +0.052981 | +0.006370 | +0.081378 | +0.054328 | -0.006424 |
| | -0.006277 | +0.013635 | +0.117156 | -0.037470 | +0.014036 | -0.048765 | +0.093100 | -0.147319 | +0.028556 | -0.017833 |
| | -0.070005 | -0.123845 | +0.013978 | +0.006964 | -0.047420 | +0.100905 | -0.019278 | -0.009641 | +0.057287 | +0.058665 |
| | -0.063796 | +0.019097 | -0.045014 | -0.036129 | +0.022014 | +0.071405 | +0.028573 | +0.046653 | +0.063911 | -0.048555 |
| | -0.070203 | +0.205558 | -0.051782 | +0.102727 | +0.042066 | +0.028359 | -0.021939 | -0.082837 | +0.064817 | +0.017215 |
| | -0.042670 | -0.031901 | +0.037475 | +0.055012 | -0.012237 | -0.067371 | +0.072587 | -0.009949 | +0.053991 | +0.019722 |
| | -0.035742 | +0.081726 | +0.019732 | +0.013624 | -0.031871 | -0.009025 | -0.064237 | +0.002162 | +0.014326 | +0.103617 |
| | -0.048376 | +0.034422 | -0.019797 | +0.041018 | +0.089878 | +0.072000 | +0.030657 | +0.040709 | -0.071603 | +0.005629 |
| | ⋮ | | | | | | | | | |

FIG. 15A

EXAMPLE OF NORM DIVISION TABLE (256 DIVISIONS)

| | 0 | 1 | 2 | 3 | 4 | 5 | 6 | 7 | 8 | 9 |
|---|---|---|---|---|---|---|---|---|---|---|
| 0 | 0.00000 | 0.03320 | 0.04112 | 0.04617 | 0.04999 | 0.05354 | 0.05687 | 0.05940 | 0.06182 | 0.06416 |
| 10 | 0.06585 | 0.06805 | 0.06965 | 0.07121 | 0.07275 | 0.07425 | 0.07572 | 0.07716 | 0.07858 | 0.07951 |
| 20 | 0.08088 | 0.08178 | 0.08312 | 0.08400 | 0.08530 | 0.08616 | 0.08701 | 0.08827 | 0.08910 | 0.08992 |
| 30 | 0.09073 | 0.09194 | 0.09273 | 0.09352 | 0.09431 | 0.09508 | 0.09585 | 0.09662 | 0.09737 | 0.09813 |
| 40 | 0.09887 | 0.09961 | 0.10035 | 0.10108 | 0.10180 | 0.10252 | 0.10324 | 0.10395 | 0.10465 | 0.10535 |
| 50 | 0.10605 | 0.10639 | 0.10708 | 0.10776 | 0.10844 | 0.10912 | 0.10979 | 0.11046 | 0.11079 | 0.11145 |
| 60 | 0.11211 | 0.11276 | 0.11309 | 0.11374 | 0.11438 | 0.11502 | 0.11566 | 0.11598 | 0.11661 | 0.11724 |
| 70 | 0.11786 | 0.11849 | 0.11879 | 0.11941 | 0.12003 | 0.12064 | 0.12094 | 0.12155 | 0.12215 | 0.12275 |
| 80 | 0.12305 | 0.12365 | 0.12424 | 0.12483 | 0.12542 | 0.12571 | 0.12629 | 0.12687 | 0.12745 | 0.12774 |
| 90 | 0.12831 | 0.12888 | 0.12945 | 0.13002 | 0.13030 | 0.13087 | 0.13143 | 0.13198 | 0.13254 | 0.13282 |
| 100 | 0.13337 | 0.13392 | 0.13447 | 0.13501 | 0.13556 | 0.13583 | 0.13637 | 0.13690 | 0.13744 | 0.13797 |
| 110 | 0.13851 | 0.13904 | 0.13956 | 0.13983 | 0.14035 | 0.14087 | 0.14139 | 0.14191 | 0.14243 | 0.14295 |
| 120 | 0.14346 | 0.14397 | 0.14448 | 0.14499 | 0.14549 | 0.14600 | 0.14650 | 0.14700 | 0.14750 | 0.14800 |

FIG. 15B

| | | | | | | | | | | |
|---|---|---|---|---|---|---|---|---|---|---|
| 130 | 0.14849 | 0.14899 | 0.14948 | 0.14997 | 0.15046 | 0.15095 | 0.15143 | 0.15192 | 0.15240 | 0.15288 |
| 140 | 0.15336 | 0.15408 | 0.15456 | 0.15503 | 0.15551 | 0.15598 | 0.15645 | 0.15715 | 0.15762 | 0.15808 |
| 150 | 0.15878 | 0.15924 | 0.15970 | 0.16016 | 0.16085 | 0.16131 | 0.16199 | 0.16244 | 0.16289 | 0.16357 |
| 160 | 0.16402 | 0.16469 | 0.16513 | 0.16580 | 0.16624 | 0.16690 | 0.16734 | 0.16800 | 0.16866 | 0.16909 |
| 170 | 0.16974 | 0.17039 | 0.17104 | 0.17147 | 0.17211 | 0.17275 | 0.17338 | 0.17402 | 0.17465 | 0.17507 |
| 180 | 0.17570 | 0.17633 | 0.17716 | 0.17778 | 0.17840 | 0.17902 | 0.17963 | 0.18024 | 0.18106 | 0.18166 |
| 190 | 0.18227 | 0.18308 | 0.18368 | 0.18447 | 0.18507 | 0.18586 | 0.18665 | 0.18724 | 0.18803 | 0.18881 |
| 200 | 0.18958 | 0.19036 | 0.19113 | 0.19190 | 0.19266 | 0.19342 | 0.19437 | 0.19512 | 0.19606 | 0.19681 |
| 210 | 0.19774 | 0.19867 | 0.19959 | 0.20051 | 0.20143 | 0.20252 | 0.20342 | 0.20450 | 0.20540 | 0.20647 |
| 220 | 0.20754 | 0.20860 | 0.20983 | 0.21087 | 0.21209 | 0.21330 | 0.21450 | 0.21587 | 0.21706 | 0.21858 |
| 230 | 0.21992 | 0.22142 | 0.22291 | 0.22438 | 0.22602 | 0.22780 | 0.22957 | 0.23148 | 0.23338 | 0.23557 |
| 240 | 0.23774 | 0.24005 | 0.24249 | 0.24520 | 0.24818 | 0.25142 | 0.25505 | 0.25919 | 0.26369 | 0.26921 |
| 250 | 0.27595 | 0.28434 | 0.29600 | 0.31512 | 0.35936 | 0.49100 | 0.85733 | | | |

FIG. 16

EXAMPLE OF DECLINATION DIVISION TABLE (4 DIVISIONS)

| DIVISION NUMBER | DIVISION BOUNDARY |
|---|---|
| 0 | 0.8274 |
| 1 | 0.9079 |
| 2 | 0.9301 |
| 3 | 0.9486 |
| 4 | 1.0000 |

FIG. 17A

| DIVISION | 0 | 1 | 2 | 3 | 4 | 5 | 6 | 7 | 8 | 9 |
|---|---|---|---|---|---|---|---|---|---|---|
| b=0, c=0 | | | | | | | | | | |
| 0 | +9.99999 | +0.03142 | +0.01968 | +0.01436 | +0.01008 | +0.00750 | +0.00536 | +0.00355 | +0.00220 | +0.00100 |
| 10 | +0.00010 | -0.00089 | -0.00164 | -0.00233 | -0.00298 | -0.00347 | -0.00404 | -0.00447 | -0.00498 | -0.00537 |
| 20 | -0.00574 | -0.00609 | -0.00643 | -0.00675 | -0.00706 | -0.00736 | -0.00764 | -0.00792 | -0.00812 | -0.00838 |
| 30 | -0.00857 | -0.00881 | -0.00904 | -0.00921 | -0.00938 | -0.00959 | -0.00975 | -0.00996 | -0.01010 | -0.01025 |
| 40 | -0.01039 | -0.01058 | -0.01071 | -0.01084 | -0.01097 | -0.01110 | -0.01122 | -0.01139 | -0.01150 | -0.01162 |
| 50 | -0.01173 | -0.01185 | -0.01196 | -0.01206 | -0.01217 | -0.01227 | -0.01237 | -0.01247 | -0.01257 | -0.01267 |
| 60 | -0.01276 | -0.01286 | -0.01292 | -0.01301 | -0.01310 | -0.01319 | -0.01327 | -0.01336 | -0.01344 | -0.01352 |
| 70 | -0.01360 | -0.01368 | -0.01376 | -0.01381 | -0.01389 | -0.01397 | -0.01404 | -0.01411 | -0.01418 | -0.01426 |
| 80 | -0.01433 | -0.01439 | -0.01446 | -0.01453 | -0.01457 | -0.01464 | -0.01470 | -0.01477 | -0.01483 | -0.01489 |
| 90 | -0.01496 | -0.01502 | -0.01508 | -0.01514 | -0.01519 | -0.01525 | -0.01531 | -0.01536 | -0.01542 | -0.01547 |
| 100 | -0.01553 | -0.01558 | -0.01564 | -0.01569 | -0.01574 | -0.01579 | -0.01584 | -0.01589 | -0.01594 | -0.01599 |
| 110 | -0.01604 | -0.01609 | -0.01613 | -0.01618 | -0.01623 | -0.01627 | -0.01633 | -0.01638 | -0.01642 | -0.01646 |
| 120 | -0.01651 | -0.01656 | -0.01661 | -0.01665 | -0.01669 | -0.01673 | -0.01678 | -0.01682 | -0.01686 | -0.01692 |
| 130 | -0.01695 | -0.01699 | -0.01704 | -0.01708 | -0.01712 | -0.01717 | -0.01720 | -0.01725 | -0.01729 | -0.01733 |
| 140 | -0.01737 | -0.01741 | -0.01745 | -0.01749 | -0.01753 | -0.01757 | -0.01761 | -0.01766 | -0.01769 | -0.01773 |
| 150 | -0.01777 | -0.01780 | -0.01784 | -0.01788 | -0.01792 | -0.01796 | -0.01800 | -0.01804 | -0.01808 | -0.01812 |
| 160 | -0.01816 | -0.01819 | -0.01823 | -0.01827 | -0.01830 | -0.01835 | -0.01838 | -0.01842 | -0.01846 | -0.01849 |
| 170 | -0.01854 | -0.01857 | -0.01861 | -0.01864 | -0.01868 | -0.01872 | -0.01875 | -0.01879 | -0.01883 | -0.01887 |
| 180 | -0.01891 | -0.01894 | -0.01898 | -0.01902 | -0.01906 | -0.01909 | -0.01913 | -0.01917 | -0.01920 | -0.01924 |
| 190 | -0.01928 | -0.01932 | -0.01936 | -0.01939 | -0.01943 | -0.01947 | -0.01951 | -0.01955 | -0.01958 | -0.01962 |
| 200 | -0.01966 | -0.01970 | -0.01974 | -0.01978 | -0.01982 | -0.01986 | -0.01990 | -0.01994 | -0.01998 | -0.02002 |
| 210 | -0.02006 | -0.02010 | -0.02015 | -0.02019 | -0.02023 | -0.02027 | -0.02032 | -0.02036 | -0.02040 | -0.02045 |
| 220 | -0.02049 | -0.02054 | -0.02059 | -0.02063 | -0.02068 | -0.02073 | -0.02078 | -0.02083 | -0.02088 | -0.02094 |
| 230 | -0.02099 | -0.02104 | -0.02110 | -0.02116 | -0.02121 | -0.02128 | -0.02134 | -0.02140 | -0.02147 | -0.02154 |
| 240 | -0.02161 | -0.02169 | -0.02177 | -0.02185 | -0.02194 | -0.02204 | -0.02215 | -0.02227 | -0.02241 | -0.02256 |
| 250 | -0.02275 | -0.02299 | -0.02334 | -0.02401 | -0.02527 | | | | | |

FIG. 17B b=0, c=3

| | | | | | | | | | | |
|---|---|---|---|---|---|---|---|---|---|---|
| 0 | +9.99999 | +0.04126 | +0.03220 | +0.02771 | +0.02395 | +0.02162 | +0.01966 | +0.01798 | +0.01672 | +0.01559 |
| 10 | +0.01473 | +0.01378 | +0.01306 | +0.01239 | +0.01176 | +0.01129 | +0.01073 | +0.01030 | +0.00980 | +0.00942 |
| 20 | +0.00905 | +0.00871 | +0.00837 | +0.00805 | +0.00774 | +0.00744 | +0.00715 | +0.00688 | +0.00668 | +0.00642 |
| 30 | +0.00623 | +0.00598 | +0.00575 | +0.00558 | +0.00541 | +0.00519 | +0.00503 | +0.00482 | +0.00467 | +0.00452 |
| 40 | +0.00438 | +0.00419 | +0.00405 | +0.00392 | +0.00378 | +0.00365 | +0.00353 | +0.00336 | +0.00324 | +0.00312 |
| 50 | +0.00300 | +0.00289 | +0.00278 | +0.00267 | +0.00256 | +0.00245 | +0.00235 | +0.00224 | +0.00214 | +0.00204 |
| 60 | +0.00194 | +0.00185 | +0.00178 | +0.00169 | +0.00160 | +0.00151 | +0.00142 | +0.00133 | +0.00124 | +0.00116 |
| 70 | +0.00107 | +0.00099 | +0.00091 | +0.00085 | +0.00077 | +0.00070 | +0.00062 | +0.00054 | +0.00047 | +0.00039 |
| 80 | +0.00032 | +0.00025 | +0.00018 | +0.00010 | +0.00006 | -0.00001 | -0.00008 | -0.00015 | -0.00021 | -0.00028 |
| 90 | -0.00034 | -0.00040 | -0.00047 | -0.00053 | -0.00059 | -0.00065 | -0.00071 | -0.00077 | -0.00083 | -0.00089 |
| 100 | -0.00094 | -0.00100 | -0.00106 | -0.00111 | -0.00117 | -0.00122 | -0.00127 | -0.00133 | -0.00138 | -0.00143 |
| 110 | -0.00148 | -0.00153 | -0.00158 | -0.00163 | -0.00168 | -0.00173 | -0.00179 | -0.00184 | -0.00189 | -0.00193 |
| 120 | -0.00198 | -0.00204 | -0.00208 | -0.00213 | -0.00217 | -0.00221 | -0.00227 | -0.00231 | -0.00236 | -0.00241 |
| 130 | -0.00245 | -0.00249 | -0.00255 | -0.00259 | -0.00263 | -0.00268 | -0.00272 | -0.00277 | -0.00281 | -0.00286 |
| 140 | -0.00289 | -0.00294 | -0.00298 | -0.00303 | -0.00306 | -0.00311 | -0.00316 | -0.00320 | -0.00324 | -0.00328 |
| 150 | -0.00333 | -0.00336 | -0.00340 | -0.00345 | -0.00349 | -0.00353 | -0.00357 | -0.00361 | -0.00366 | -0.00370 |
| 160 | -0.00374 | -0.00378 | -0.00382 | -0.00386 | -0.00389 | -0.00394 | -0.00398 | -0.00402 | -0.00406 | -0.00410 |
| 170 | -0.00414 | -0.00418 | -0.00423 | -0.00426 | -0.00430 | -0.00434 | -0.00438 | -0.00442 | -0.00446 | -0.00451 |
| 180 | -0.00455 | -0.00458 | -0.00463 | -0.00467 | -0.00470 | -0.00474 | -0.00478 | -0.00483 | -0.00486 | -0.00491 |
| 190 | -0.00494 | -0.00499 | -0.00503 | -0.00507 | -0.00511 | -0.00515 | -0.00519 | -0.00523 | -0.00527 | -0.00532 |
| 200 | -0.00536 | -0.00540 | -0.00544 | -0.00548 | -0.00553 | -0.00557 | -0.00562 | -0.00566 | -0.00571 | -0.00575 |
| 210 | -0.00579 | -0.00584 | -0.00589 | -0.00593 | -0.00598 | -0.00602 | -0.00607 | -0.00612 | -0.00617 | -0.00622 |
| 220 | -0.00627 | -0.00632 | -0.00637 | -0.00642 | -0.00647 | -0.00653 | -0.00658 | -0.00663 | -0.00669 | -0.00675 |
| 230 | -0.00680 | -0.00686 | -0.00692 | -0.00699 | -0.00705 | -0.00712 | -0.00719 | -0.00726 | -0.00733 | -0.00741 |
| 240 | -0.00749 | -0.00757 | -0.00766 | -0.00775 | -0.00786 | -0.00797 | -0.00808 | -0.00821 | -0.00837 | -0.00854 |
| 250 | -0.00875 | -0.00901 | -0.00941 | -0.01015 | -0.01157 | | | | | |

FIG. 18A

| DIVISION | 0 | 1 | 2 | 3 | 4 | 5 | 6 | 7 | 8 | 9 |
|---|---|---|---|---|---|---|---|---|---|---|
| b=0, c=0 | | | | | | | | | | |
| 0 | +9.99999 | +0.03665 | +0.03356 | +0.03363 | +0.03460 | +0.03613 | +9.99999 | +9.99999 | +9.99999 | +9.99999 |
| b=0, c=1 | | | | | | | | | | |
| 0 | +9.99999 | +0.03869 | +0.03581 | +0.03588 | +0.03678 | +0.03821 | +9.99999 | +9.99999 | +9.99999 | +9.99999 |
| b=0, c=2 | | | | | | | | | | |
| 0 | +9.99999 | +0.04164 | +0.03912 | +0.03918 | +0.03997 | +0.04122 | +9.99999 | +9.99999 | +9.99999 | +9.99999 |
| b=0, c=3 | | | | | | | | | | |
| 0 | +9.99999 | +0.04476 | +0.04275 | +0.04280 | +0.04344 | +0.04444 | +9.99999 | +9.99999 | +9.99999 | +9.99999 |
| b=1, c=0 | | | | | | | | | | |
| 60 | +9.99999 | +9.99999 | +9.99999 | +0.11286 | +0.11079 | +0.10939 | +0.10827 | +0.10731 | +0.10648 | +0.10573 |
| 70 | +0.10506 | +0.10444 | +0.10387 | +0.10335 | +0.10302 | +0.10255 | +0.10212 | +0.10171 | +0.10133 | +0.10097 |
| 80 | +0.10064 | +0.10032 | +0.10003 | +0.09975 | +0.09949 | +0.09932 | +0.09909 | +0.09887 | +0.09866 | +0.09846 |
| 90 | +0.09828 | +0.09811 | +0.09795 | +0.09781 | +0.09767 | +0.09754 | +0.09742 | +0.09731 | +0.09722 | +0.09712 |
| 100 | +0.09704 | +0.09697 | +0.09690 | +0.09685 | +0.09679 | +0.09675 | +0.09671 | +0.09669 | +0.09666 | +0.09665 |
| 110 | +0.09663 | +0.09663 | +0.09664 | +0.09665 | +0.09666 | +0.09668 | +0.09671 | +0.09675 | +0.09679 | +0.09684 |
| 120 | +0.09689 | +0.09694 | +0.09703 | +0.09709 | +0.09717 | +0.09725 | +0.09733 | +0.09745 | +0.09754 | +0.09764 |
| 130 | +0.09778 | +0.09789 | +0.09800 | +0.09816 | +0.09829 | +0.09842 | +0.09860 | +0.09875 | +0.09894 | +0.09910 |
| 140 | +0.09931 | +0.09947 | +0.09970 | +0.09988 | +0.10012 | +0.10031 | +0.10057 | +0.10084 | +0.10112 | +0.10134 |
| 150 | +0.10163 | +0.10194 | +0.10218 | +0.10252 | +0.10286 | +0.10322 | +0.10359 | +0.10397 | +0.10438 | +0.10480 |
| 160 | +0.10524 | +0.10571 | +0.10620 | +0.10672 | +0.10727 | +0.10787 | +0.10868 | +0.10941 | +0.11023 | +0.11149 |
| 170 | +0.11287 | +9.99999 | +9.99999 | +9.99999 | +9.99999 | +9.99999 | +9.99999 | +9.99999 | +9.99999 | +9.99999 |

FIG. 18B b=1, c=1

| | | | | | | | | | | |
|---|---|---|---|---|---|---|---|---|---|---|
| 60 | +9.99999 | +9.99999 | +9.99999 | +0.11816 | +0.11626 | +0.11497 | +0.11394 | +0.11306 | +0.11229 | +0.11160 |
| 70 | +0.11098 | +0.11040 | +0.10987 | +0.10939 | +0.10908 | +0.10865 | +0.10824 | +0.10786 | +0.10751 | +0.10718 |
| 80 | +0.10686 | +0.10657 | +0.10629 | +0.10604 | +0.10579 | +0.10564 | +0.10542 | +0.10521 | +0.10502 | +0.10483 |
| 90 | +0.10466 | +0.10450 | +0.10436 | +0.10422 | +0.10409 | +0.10397 | +0.10386 | +0.10376 | +0.10366 | +0.10358 |
| 100 | +0.10350 | +0.10343 | +0.10337 | +0.10332 | +0.10327 | +0.10323 | +0.10320 | +0.10317 | +0.10315 | +0.10313 |
| 110 | +0.10312 | +0.10312 | +0.10312 | +0.10313 | +0.10315 | +0.10317 | +0.10319 | +0.10323 | +0.10327 | +0.10331 |
| 120 | +0.10336 | +0.10341 | +0.10349 | +0.10355 | +0.10362 | +0.10369 | +0.10377 | +0.10388 | +0.10397 | +0.10406 |
| 130 | +0.10419 | +0.10430 | +0.10440 | +0.10455 | +0.10467 | +0.10479 | +0.10496 | +0.10510 | +0.10528 | +0.10543 |
| 140 | +0.10562 | +0.10578 | +0.10599 | +0.10616 | +0.10638 | +0.10656 | +0.10680 | +0.10705 | +0.10731 | +0.10752 |
| 150 | +0.10779 | +0.10808 | +0.10831 | +0.10861 | +0.10893 | +0.10927 | +0.10961 | +0.10997 | +0.11034 | +0.11074 |
| 160 | +0.11115 | +0.11158 | +0.11203 | +0.11251 | +0.11302 | +0.11357 | +0.11432 | +0.11499 | +0.11575 | +0.11690 |
| 170 | +0.11817 | +9.99999 | +9.99999 | +9.99999 | +9.99999 | +9.99999 | +9.99999 | +9.99999 | +9.99999 | +9.99999 |

FIG. 18C b=1, c=2

| | | | | | | | | | | |
|---|---|---|---|---|---|---|---|---|---|---|
| 60 | +9.99999 | +9.99999 | +9.99999 | +0.12564 | +0.12403 | +0.12294 | +0.12206 | +0.12131 | +0.12065 | +0.12006 |
| 70 | +0.11951 | +0.11902 | +0.11856 | +0.11814 | +0.11787 | +0.11749 | +0.11714 | +0.11681 | +0.11650 | +0.11621 |
| 80 | +0.11594 | +0.11568 | +0.11544 | +0.11521 | +0.11500 | +0.11486 | +0.11467 | +0.11449 | +0.11431 | +0.11415 |
| 90 | +0.11400 | +0.11386 | +0.11373 | +0.11361 | +0.11350 | +0.11339 | +0.11329 | +0.11321 | +0.11312 | +0.11305 |
| 100 | +0.11298 | +0.11292 | +0.11286 | +0.11282 | +0.11277 | +0.11274 | +0.11271 | +0.11268 | +0.11267 | +0.11265 |
| 110 | +0.11264 | +0.11264 | +0.11264 | +0.11265 | +0.11266 | +0.11268 | +0.11270 | +0.11274 | +0.11277 | +0.11281 |
| 120 | +0.11285 | +0.11290 | +0.11297 | +0.11302 | +0.11308 | +0.11315 | +0.11322 | +0.11331 | +0.11339 | +0.11347 |
| 130 | +0.11359 | +0.11368 | +0.11377 | +0.11391 | +0.11401 | +0.11412 | +0.11427 | +0.11439 | +0.11455 | +0.11467 |
| 140 | +0.11485 | +0.11498 | +0.11517 | +0.11532 | +0.11552 | +0.11567 | +0.11588 | +0.11610 | +0.11633 | +0.11651 |
| 150 | +0.11675 | +0.11700 | +0.11720 | +0.11747 | +0.11774 | +0.11803 | +0.11833 | +0.11864 | +0.11897 | +0.11931 |
| 160 | +0.11966 | +0.12003 | +0.12043 | +0.12084 | +0.12128 | +0.12175 | +0.12239 | +0.12296 | +0.12361 | +0.12458 |
| 170 | +0.12564 | +9.99999 | +9.99999 | +9.99999 | +9.99999 | +9.99999 | +9.99999 | +9.99999 | +9.99999 | +9.99999 |

VECTOR INDEX PREPARING METHOD, SIMILAR VECTOR SEARCHING METHOD, AND APPARATUSES FOR THE METHODS

TECHNICAL FIELD

The present invention relates to an index preparing method and apparatus for utilizing a calculator and/or a computer to perform search, classification, tendency analysis, and the like of vector data with respect to a vector database as a group of vector data (N-dimensional real vector usually called "characteristic vector" obtained by arranging N real numbers indicating data characteristics) prepared by extracting respective data characteristics from various electronically accumulated databases (data groups) of text information, image information, sound information, questionnaire result, sales result (POS) and other data. The present invention also relates to a similar vector searching method and apparatus for using the index prepared by the aforementioned method and apparatus to efficiently search a vector similar to a designated vector.

BACKGROUND ART

In recent years, with formation of a database of multimedia information of text, image, sound, and the like, and spread of a POS system, and the like, a technique for efficiently executing search, classification, tendency analysis, and the like of a vector database of an assembly of several hundreds of thousands to several millions of pieces of vector data of several tens to several hundreds of dimensions has intensively been researched/developed in computer systems such as a multimedia database system and a data mining system.

For example, with a newspaper article database, for the database in which a large number of pieces of newspaper article data are accumulated, a dictionary of w words is used to extract an appearance frequency fk of each word k in the dictionary from each newspaper article, and each newspaper article is represented as a set of an identification number i and W-dimensional real vector ($f_1$, $f_2$, . . . , $f_w$). This vector is converted by a main component analyzing technique, and main N (N<W) components are obtained and used as vector data. An inner product of the vector data corresponding to the designated newspaper article, and a vector corresponding to another newspaper article in the database is calculated, the newspaper article having the vector with a largest inner product is obtained, and high-precision similar article search is possible. U.S. Pat. No. 4,839,853 discloses a document searching method in which such vector data is used.

Moreover, with a photograph database, each photograph data is subjected to a two-dimensional Fourier transform with respect to the database in which a large number of pieces of photograph image data are accumulated, and main N Fourier components are obtained as the vector data by extracting $f_k$ and representing each photograph data by a set of a photograph number i and N dimensional real vector ($f_1$, $f_2$, . . . , $f_w$). A distance (size of a difference between two vectors) between the vector data corresponding to the designated photograph and the vector corresponding to another photograph data in the database is calculated, and photograph data having the vector with a smallest distance is obtained, so that high-precision similar photograph search is possible. Furthermore, for example, several pieces of typical photograph data belonging to each of different categories such as "portrait", "landscape photograph", and "close-up photography of a flower" are presented as classification conditions, an average characteristic vector of each category is calculated, and the category of the characteristic vector with a shortest distance is assigned to each photograph data vector, so that remaining photograph data can automatically be classified into the aforementioned three categories.

Since an efficient similar searching method of a remarkably high-dimensional vector of several tens to several hundreds of dimensions is necessary for such use, various methods have been researched. For example, a high-dimensional vector index preparing method and similarity searching method using a multidimensional searching (SR) tree are disclosed in "The SR-tree: An Index Structure for High-Dimensional Nearest Neighbor Queries" Proceedings of the SIGMOD '97, ACM (1997) by Norio Katayama and Shinichi Satoh. Moreover, a high-dimensional vector index preparing method and similarity searching method based on Boronoi division are disclosed in "Near Neighbor Search in Large Metric Spaces", Proceedings of the VIDB'95, Morgan-Kaufman Publishers (1995) by Sergey Brin. Furthermore, a high-dimensional vector index preparing method and similarity searching method based on data partitioning technique called "pyramid technique" are disclosed in "the Pyramid-Technique: towards Breaking the Curse of Dimensionarity", Proceedings of the SIGMOD'98, ACM (1998) by Stefan Berchtold, Christian Bohm and Hans Kriegel.

However, these conventional vector index preparing method and similar vector searching methods have problems that any one of the following four conditions is not satisfied, and the methods cannot broadly be applied to broad-range applications.

1) High-speed search is possible even when the vector is of several hundreds of dimensions.

2) During similarity searching, either one of two types of similarity of the distance between the vectors and the vector inner product can be selected.

3) The similarity searching of "obtaining L vectors having most similarity" can be performed. Furthermore, even when L is relatively large (several tens to several hundreds), a search processing is not excessively delayed.

4) A similarity search range such as "inner product of 0.6 or more" can be designated.

5) A calculation amount required for index preparing is in a practical range (i.e., the index can be prepared in a time proportional to a vector data amount n, or a n*log(n) time).

Concretely, the method using the SR tree does not satisfy the above 1), 2), the method based on Boronoi division does not satisfy 2), 5), and the method using the pyramid technique does not satisfy 2), 3).

A vector index preparing method, similar vector searching method, and apparatuses for the methods of the present invention solve these problems of the conventional technique. A high-dimensional vector is decomposed to a plurality of partial vectors, and a direction and size of each partial vector are represented and recorded by a set of a belonging region number defined by a center vector, an angle (declination) formed with the center vector, and a norm division indicating a norm. Therefore, a search object range of the vector index can precisely be limited even for any query vector. When a difference between a partial inner product lower limit value (upper limit value of a partial square distance) and an actual partial inner product (partial square distance) is accumulated, an efficient search result by a branch limiting technique can be defined. Therefore, the vector index preparing method and similar vector searching method are provided which satisfies all of the above 1) to 4) and which can be applied to a broad range application.

To solve the aforementioned problem, according to a first aspect of the present invention, there are provided a vector index preparing method and apparatus comprising: means for calculating a partial vector; means for tabulating a norm distribution and preparing a norm division table; means for calculating a region number; means for tabulating a declination distribution and preparing a declination division table; means for calculating a norm division number; means for calculating a declination division number; means for calculating index data; and means for constituting an index. Thereby, even when the vector is of several hundreds of dimensions, a high-speed search is possible with respect to a vector database having unclear direction and norm distribution. During similarity searching, either one of two types of similarity of a distance between vectors and a vector inner product can be selected. The similarity search of a type such that "most similar L vectors are obtained" can be performed. Furthermore, even when L is relatively large (several tens to several hundreds), a search processing is not excessively delayed. A similarity search range such as "inner product of 0.6 or more" can be designated. Additionally, a calculation amount required for index preparation is in a practical range. Such vector index can effectively be prepared.

Moreover, in addition to the first aspect, the vector index preparing method and apparatus according to a second aspect of the present invention further comprise means for calculating a component division number. Thereby, in addition to the effect of the first aspect, an effect is produced that a calculation error by quantization of a component is minimized and a capacity of the vector index to be prepared can remarkably be reduced.

Furthermore, according to a third aspect of the present invention, there are provided a similar vector searching method and apparatus comprising: means for calculating a partial query condition; means for preparing a search object range; means for searching an index; means for calculating an inner product difference upper limit; and means for determining a similarity search result. An accumulated value of a partial inner product difference is calculated and used as a clue to a similarity search. Thereby, even when the vector is of several hundreds of dimensions, a high-speed search is possible with respect to a vector database. The similarity search of the type such that "most similar L vectors are obtained" can be performed. Furthermore, even when L is relatively large (several tens to several hundreds), a search processing is not excessively delayed. A similarity search range such as "inner product of 0.6 or more" can be designated. Additionally, a similar vector search using the inner product as a similarity measure is effectively possible.

Moreover, according to a fourth aspect of the present invention, there are provided a similar vector searching method and apparatus comprising: means for calculating a partial query condition; means for preparing a search object range; means for searching an index; means for calculating a square distance difference upper limit; and means for determining a similarity search result. An accumulated value of a partial square distance difference is calculated and used as a clue to the similarity search. Thereby, even when the vector is of several hundreds of dimensions, a high-speed search is possible with respect to the vector database. The similarity search of the type such that "most similar L vectors are obtained" can be performed. Furthermore, even when L is relatively large (several tens to several hundreds), to the search processing is not excessively delayed. The similarity search range such as "inner product of 0.8 or less" can be designated. Additionally, the similar vector search using a distance as the similarity measure is effectively possible.

BRIEF DESCRIPTION OF THE DRAWINGS

FIG. 16 is a list showing the content example of a declination division table in the first, second, third and fourth embodiments, FIGS. 17A and 17B constitute integrally a list showing a content example (part) of a table W in the third embodiment, and FIGS. 18A, 18B and 18C constitute integrally a list showing the content example (part) of the table W in the fourth embodiment.

BEST MODE FOR CARRYING OUT THE INVENTION

<First Embodiment>

A first embodiment of the present invention will be described hereinafter with reference to the drawings.

(Constitution of Vector Index Preparing Apparatus)

Figure 1:
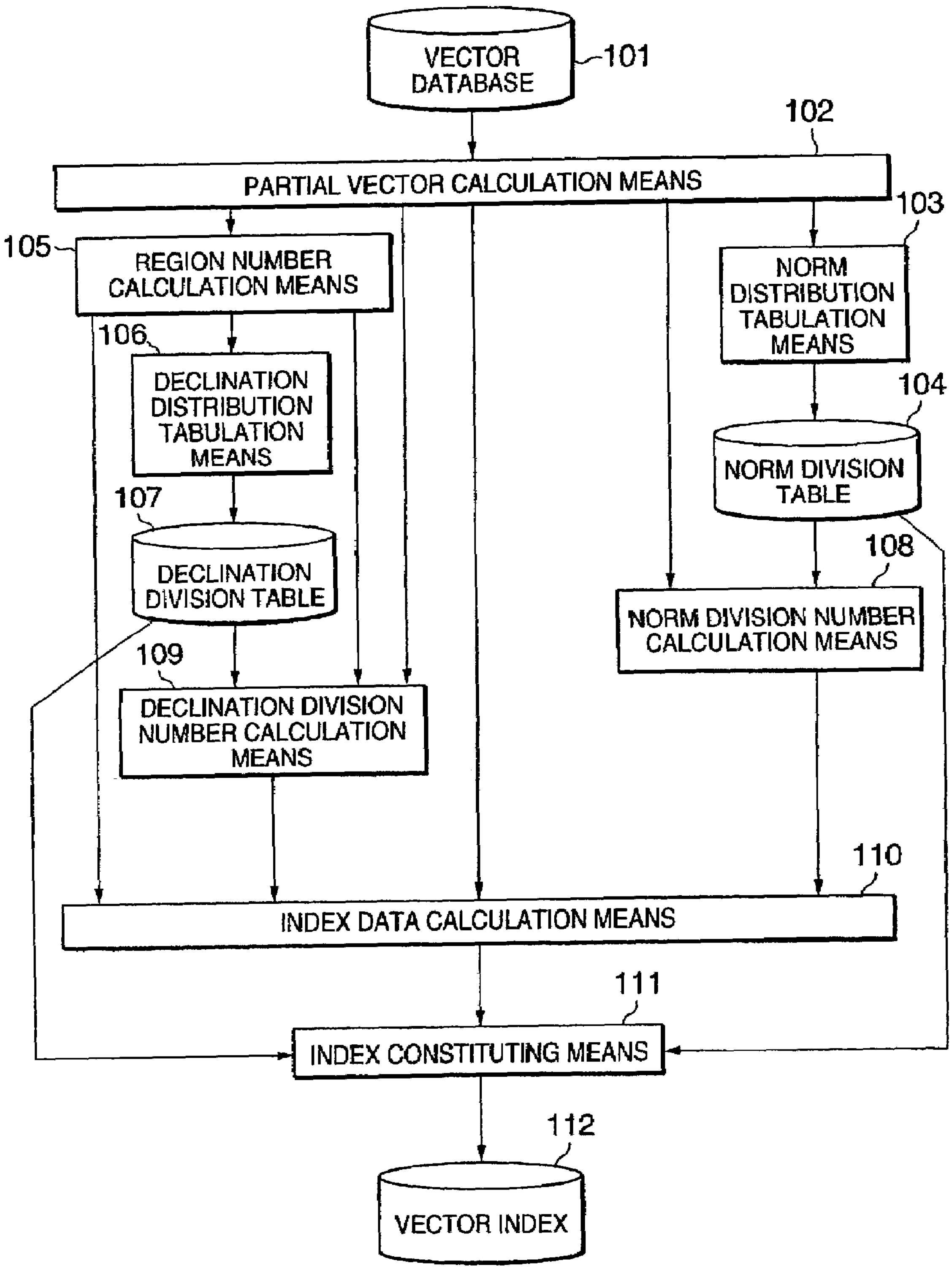
FIG. 1 is a block diagram showing a whole constitution of a vector index preparing apparatus in a first embodiment.

FIG. 1 is a block diagram showing a whole constitution of the first embodiment of a vector index preparing apparatus according to claims 1, 3 to 8, 14, 16 to 21 of the present invention. In FIG. 1, a vector database 101 stores 200,000 pieces of vector data constituted of two items of: a 296-dimensional unit real vector prepared from a newspaper article full text database of 200,000 collected newspaper articles and indicating characteristic of each newspaper article; and an identification number in a range of 1 to 200,000, and has a content as shown in FIGS. 12A and 12B.

Partial vector calculation means 102 calculates 37 types of 8-dimensional partial vectors $v_0$ to $v_{36}$ and a partial space number b of 0 to 36 with respect to a 296-dimensional vector V of each vector data in the vector database 101.

Norm distribution tabulation means 103 calculates Euclidean norm of the respective 37 partial vectors calculated by the partial vector calculation means 102 for 200,000 pieces of vector data, tabulates a distribution, and determines a norm division as a range of 256 continuous real numbers:

Norm division 0=[0, r1),

Norm division 1=[r1, r2),

. . .

Norm division 255=[r255, r256)

A norm division table 104 stores a norm division calculated by the norm distribution tabulation means 103.

Region number calculation means 105 normalizes the 8-dimensional vector whose component is any one of {0, 1, −1} and which is not 0 vector to obtain a norm of 1 with respect to each 8-dimensional partial vector v calculated by the partial vector calculation means 102.

Region center vector 0=(0, 0, 0, 0, 0, 0, 0, 1), region center vector 1=(0, 0, 0, 0, 0, 0, 0, −1), region center vector 2=(0, 0, 0, 0, 0, 0, 1, 0), region center vector 3=sqrt(1/2)*(0, 0, 0, 0, 0, 0, 1, 1), region center vector 4=sqrt(1/2)*(0, 0, 0, 0, 0, 0, 1, −1),

. . .

region center vector 5=(0, 0, 0, 0, 0, 0, −1, 0), region center vector 6554=sqrt(1/7)*(−1, −1, −1, −1, −1, −1, 1, 0), region center vector 6555=sqrt(1/8)*(−1, −1, −1, −1, −1, −1, 1, 1), region center vector 6556=sqrt(1/8)*(−1, −1, −1, −1, −1, −1, 1, −1), region center vector 6557=sqrt(1/7)*(−1, −1, −1, −1, −1, −1, −1, 0), region center vector 6558=sqrt(1/8)*(−1, −1, −1, −1, −1, −1, −1, 1), region center vector 6559=sqrt(1/8)*(−1, −1, −1, −1, −1, −1, −1, −1).

The aforementioned 6560 vectors (additionally, "sqrt(x) indicates a square root of x") are obtained as region center vectors, a region center vector $p_d$ whose inner product with the partial vector v is largest is obtained, number d is used as a region number of a belonging region of v, and cosine of an angle formed by $p_j$ and v is obtained as a declination c.

Declination distribution tabulation means 106 tabulates a distribution of a declination value c calculated by the region number calculation means 105 for 37 partial vectors of 200,000 pieces of vector data, and determines a declination division as a range of four continuous real numbers:

declination division 0=[c0, c1), declination division 1=[c1, c2), declination division 2=[c2, c3), declination division 3=[c3, c4).

A declination division table 107 stores the declination division calculated by the declination distribution tabulation means 106.

Norm division number calculation means 108 searches the norm division table 104 to determine a norm division number r to which the norm of each partial vector calculated by the partial vector calculation means 102 belongs.

Declination division number calculation means 109 searches the declination division table 107 to determine a declination division number c to which declinations of v and p belong from each partial vector v calculated by the partial vector calculation means 102 and the region center vector p calculated by the region number calculation means 105 for v.

Index data calculation means 110 prepares the following key for search from a partial vector $V_b$ and partial space number b calculated by the partial vector calculation means 102, region number d calculated by the region number calculation means 105, declination division number c calculated by the declination division number calculation means 109, and norm division number r calculated by the norm division number calculation means 108:

$$K=((b*6560+d)*4+c)*256+r,$$

and calculates a set (K, i, $v_b$) of the key K, identification number i of the partial vector and component $v_b$ as index data.

Index constituting means 111 uses a key K from the index data (K, i, $v_b$) calculated by the index data calculation means 110, and constitutes an index in which a search tree for searching (i, $v_b$), an inverse search table with a second key $$L=(d*4+c)*256+r$$

stored therein from the region number d, declination division number c and norm division number r with respect to a set of each identification number i and each partial space number b, norm division table 104 and declination division table 107 are stored.

A vector index 112 stores the search tree, inverse search table, norm division table 104 and declination division table 107 prepared by the index constituting means 111.

(Operation of Vector Index Preparing Apparatus)

Figure 5A:
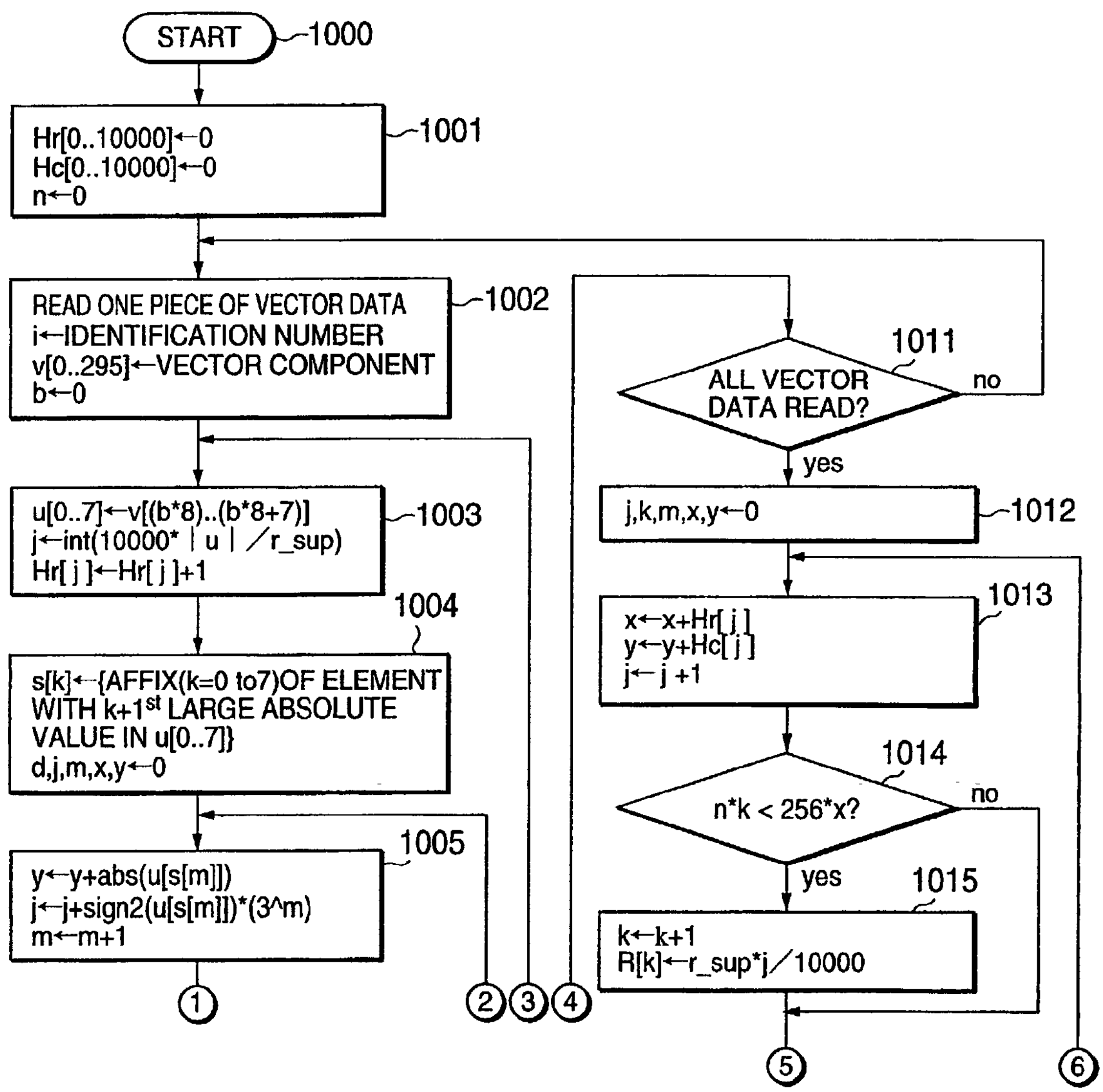
Figure 5B:
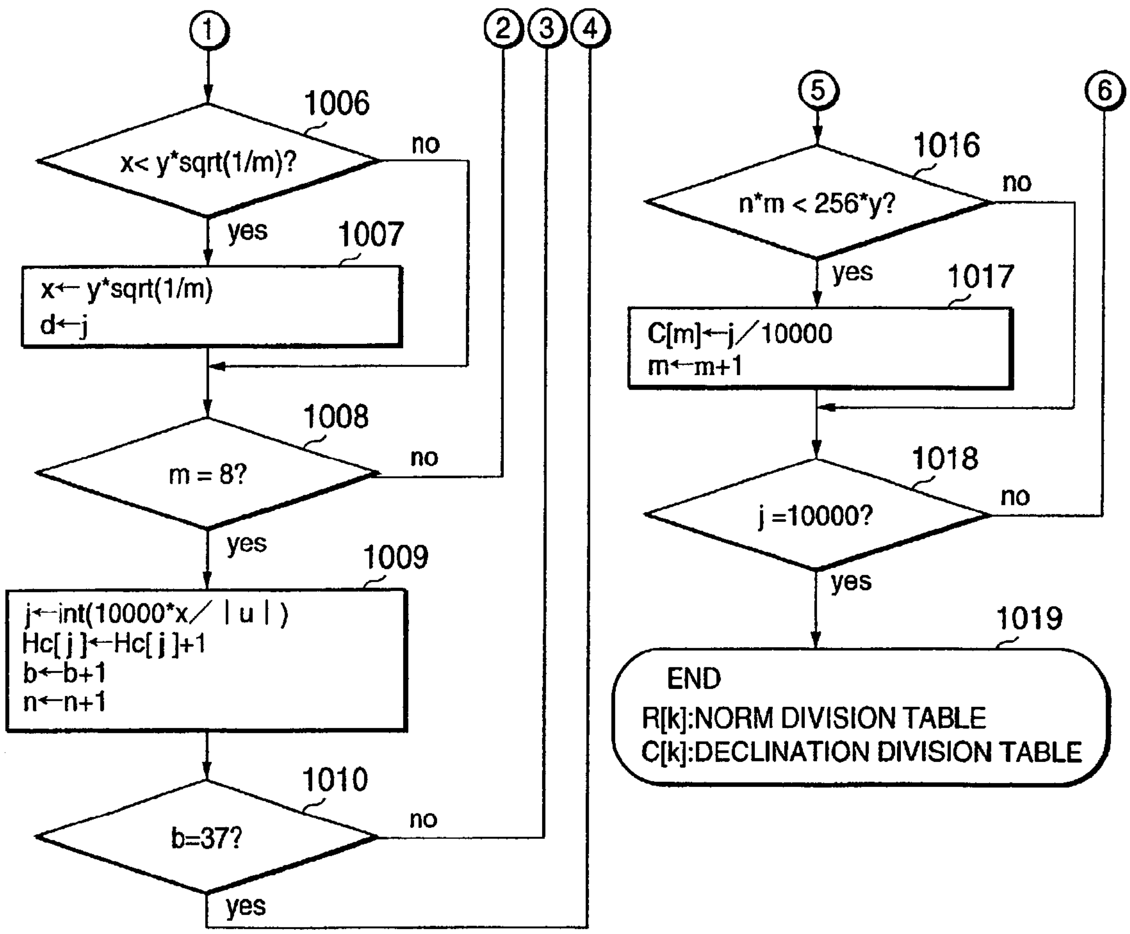
Figure 6A:
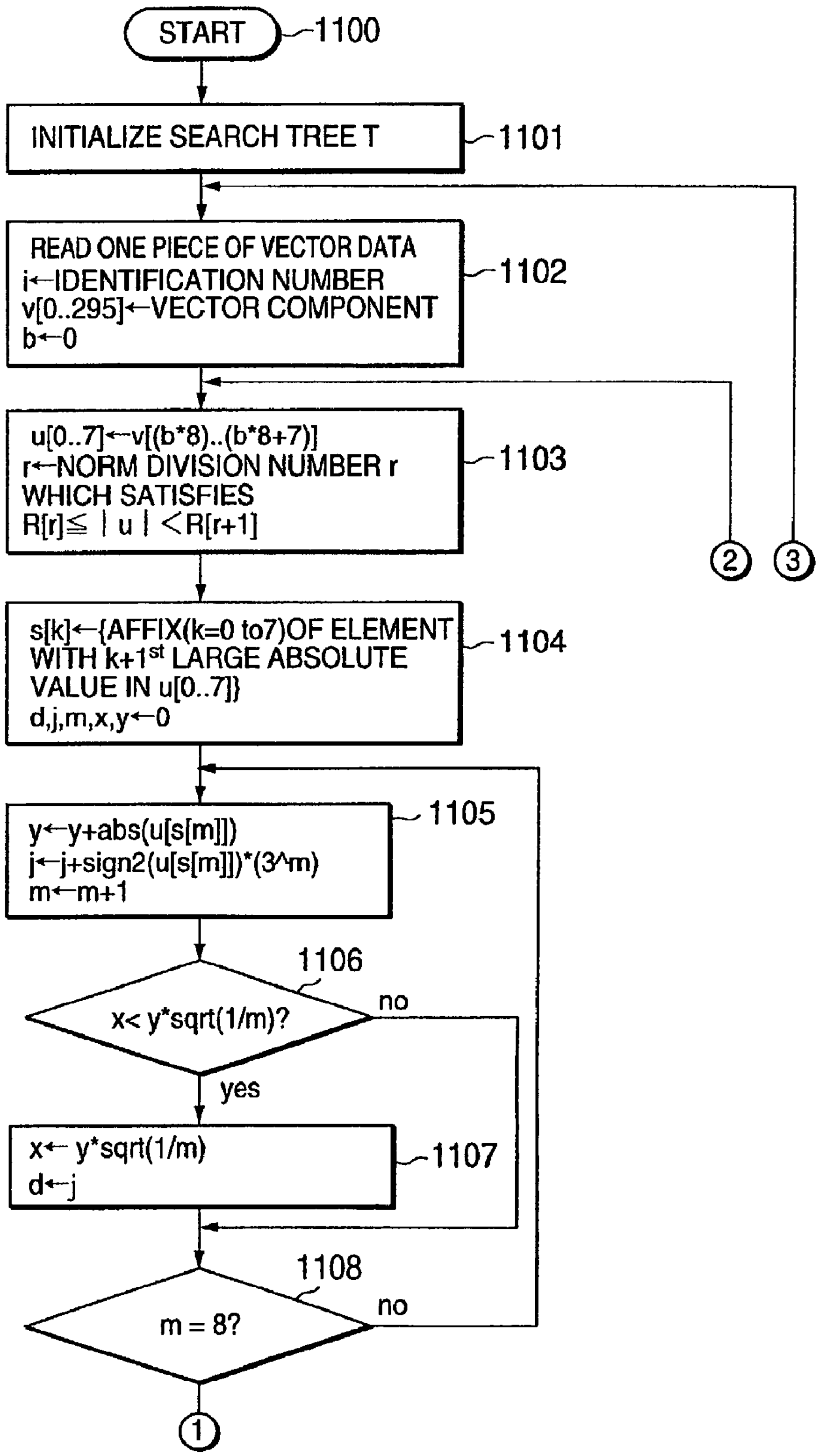

Operation of the vector index preparing apparatus constituted as described above will be described with reference to the drawings. FIGS. 5A and 5B constitute integrally a flowchart showing a preparing processing procedure of a norm division table R and declination division table C in a first step of preparing the vector index, and FIGS. 6A, 6B constitute integrally a flowchart showing the processing procedure of calculating index registration data and preparing the vector index in second and third steps of preparing the vector index. In the drawings, "sqrt(x)" denotes the square root of x, "int(x)" denotes an integer portion of x, and "abs(x)" denotes an absolute value of x, respectively. Moreover, "sign2(x)" is a function taking a value of 1 when x is not negative, and a value of 2 when x is negative.

(First Step of Vector Index Preparation)

In a first step of vector index preparation, first the partial vector calculation means 102 reads the vector data in order from the vector database 101 and calculates the partial vector. The norm distribution tabulation means 103 and declination distribution tabulation means 106 calculate a norm distribution and declination distribution of the partial vector, respectively. At the time all the vector data is processed, the norm division table and declination division table are prepared. It is assumed that a norm upper limit value of the vector in the vector database is known and the upper value is r_sup. In an example of the present embodiment, since the vector of each vector data is a unit vector, r_sup=1 is clearly obtained. When the upper limit value of the norm of the vector in the vector database is unknown, inspection may be performed beforehand to obtain r_sup.

First, in step 1001, tables Hr and Hc for tabulation are initialized to 0, and total partial vector number n is also set to 0. Subsequently, in step 1002, one piece of unprocessed vector data (i, v) is read from the vector database. The partial space number b is initialized to 0. In step 1003, 8-dimensional partial vector u is divided eight continuous components from a top of a read 296-dimensional vector v and 37 types are prepared in accordance with the value of b. For example, with first vector data of FIG. 12A, the partial vector of b=0 is as follows.

(+0.029259 −0.016005 −0.021118 +0.024992 −0.006860 −0.009032 −0.007255 −0.007715).

The partial vector of b=1 is as follows.

(−0.025648 +0.016061 −0.060584 −0.013593 −0.020985 −0.112403 −0.012045 +0.044741)

The partial vector of b=36 is as follows.

(+0.069379 +0.020206 +0.032996 +0.047815 +0.046106 +0.001794 +0.035342 −0.003895)

Subsequently, norm |u| of u is divided by the norm maximum value r_sup, multiplied by 10000, converted to an integer and accumulated in a corresponding division j of a norm distribution tabulation table Hr. A norm distribution is tabulated.

Figure 13:
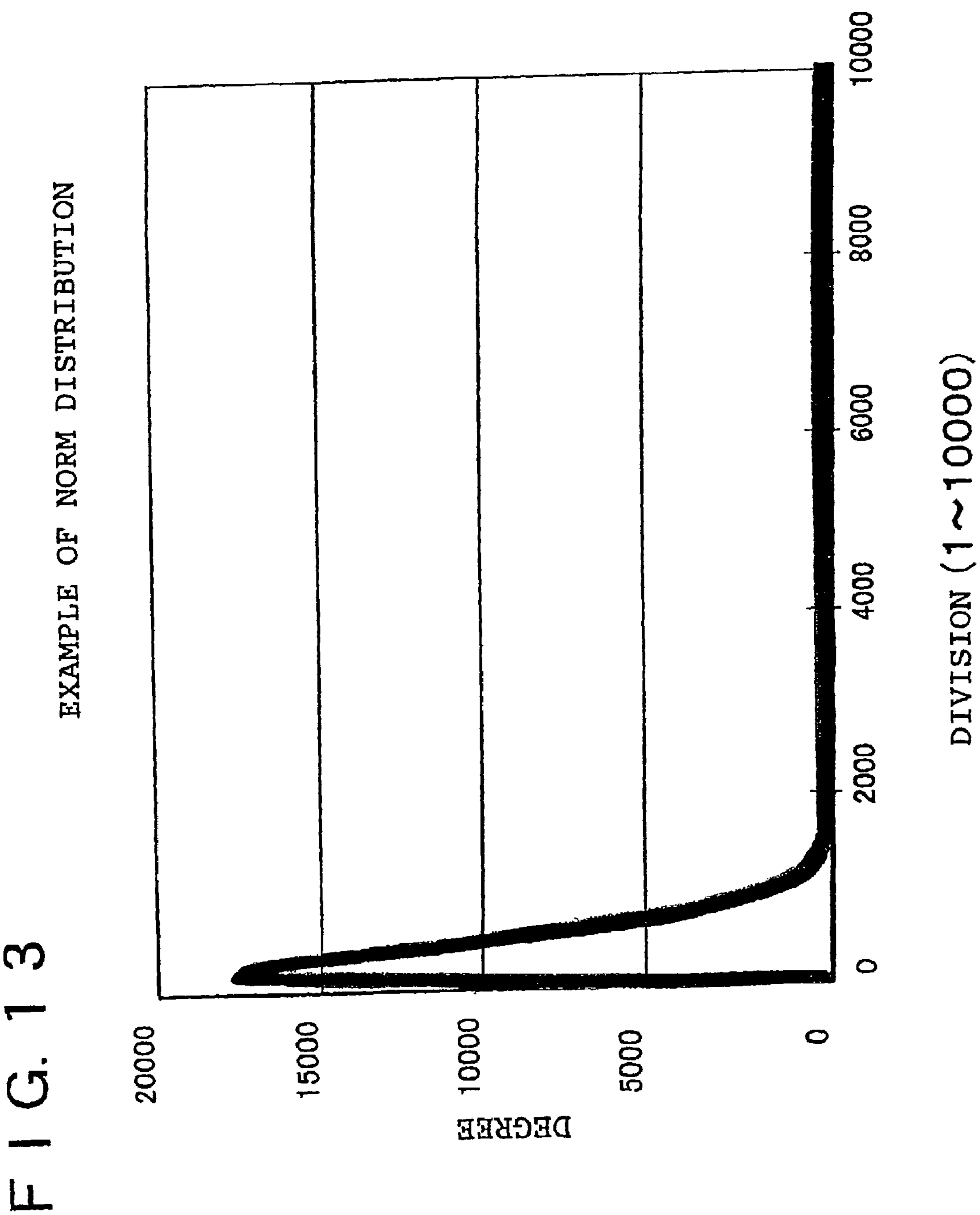
FIG. 13 is a characteristic diagram showing a norm distribution tabulation result example in the first and second embodiments.

FIG. 13 shows an example of a graph of the norm distribution tabulated in this manner. The abscissa of the graph indicates the division number of the norm distribution tabulation table Hr, and the ordinate indicates a value of Hr[j] for each division number j, that is, the number of partial vectors having norms in a norm range of the division j. With the partial vector of b=0 of the first vector data of FIG. 12A,

|u|=sqrt(0.029259*0.029259+0.016005*0.016005+ . . . +0.007715*0.007715)=0.049193, r_sup=1, and the division j results in j=int((0.049193/1.0)*10000)=491.

The declination division is tabulated in steps 1004 to 1009. First in the step 1004, component numbers are stored in order from a largest absolute value for eight components u[0] to u[7] of the partial vector u. With the partial vector of b=0 of the first vector data of FIG. 12A, since the absolute value of a 0 component is largest, the absolute value of a third component is next largest, and the absolute value of a fourth component is smallest, the following results:

s[0 . . . 7]=(0 3 2 1 5 7 6 4).

Subsequently, steps 1005 to 1008 are repeated eight times (8=dimensions of partial space) by changing a value of a variable m from 0 to 7, and a number d of a vector having a largest inner product with the partial vector u among 6560 region center vectors, and a value x of the inner product are obtained. In the step 1005, a number j of the region center vector whose m+1$^{st}$ component from the largest absolute value is *1 (code of the partial vector component) and remaining 7-m components are 0, and value y of the inner product multiplied by sqrt(m) are obtained. In the step 1006, the inner product is calculated from the value y obtained in the step 1005 by y*sqrt(1/m), and cared with the maximum value x of the inner product. When the inner product is larger than x, in the step 1007 the inner product maximum value x, and the region center vector number d are updated. A region center vector group whose component is any one of {+1, 0, −1} is used in this manner. Therefore, the numbers of the partial vector and region center vector having the largest inner product, and the value of the inner product can efficiently be obtained by very simple calculation.

With the partial vector of b=0 of the first vector data of FIG. 12A, the following results.

(|u[0]|)*sqrt(1/1)=0.029259

(|u[0]|+|u[3]|)*sqrt(1/2)=0.038361

(|u[0]|+|u[3]|+|u[2]|)*sqrt(1/3)=0.043514

(|u[0]|+|u[3]|+|u[2]|+|u[1]|)*sqrt(1/4)=0.045687

(|u[0]|+|u[3]|+|u[2]|+|u[1]|+|u[5]|)*sqrt(1/5)=0.044903

(|u[0]|+|u[3]|+|u[2]|+|u[1]|+|u[5]|+|u[7]|)*sqrt(1/6) =0.044140

(|u[0]|+|u[3]|+|u[2]|+|u[1]|+|u[5]|+|u[7]|+|u[6]|)*sqrt(1/7)=0.043608

(|u[0]|+|u[3]|+|u[2]|+|u[1]|+|u[5]|+|u[7]|+|u[6]|+|u [4]|) *sqrt(1/8)=0.043217

The maximum value x=0.045687 of the inner product, and number d=(3^7)+2*(3^6)+2*(3^5)+(3^4)=4212 of region center vector (+½, −½, −½, +½,0,0,0,0) are obtained.

Figure 14:
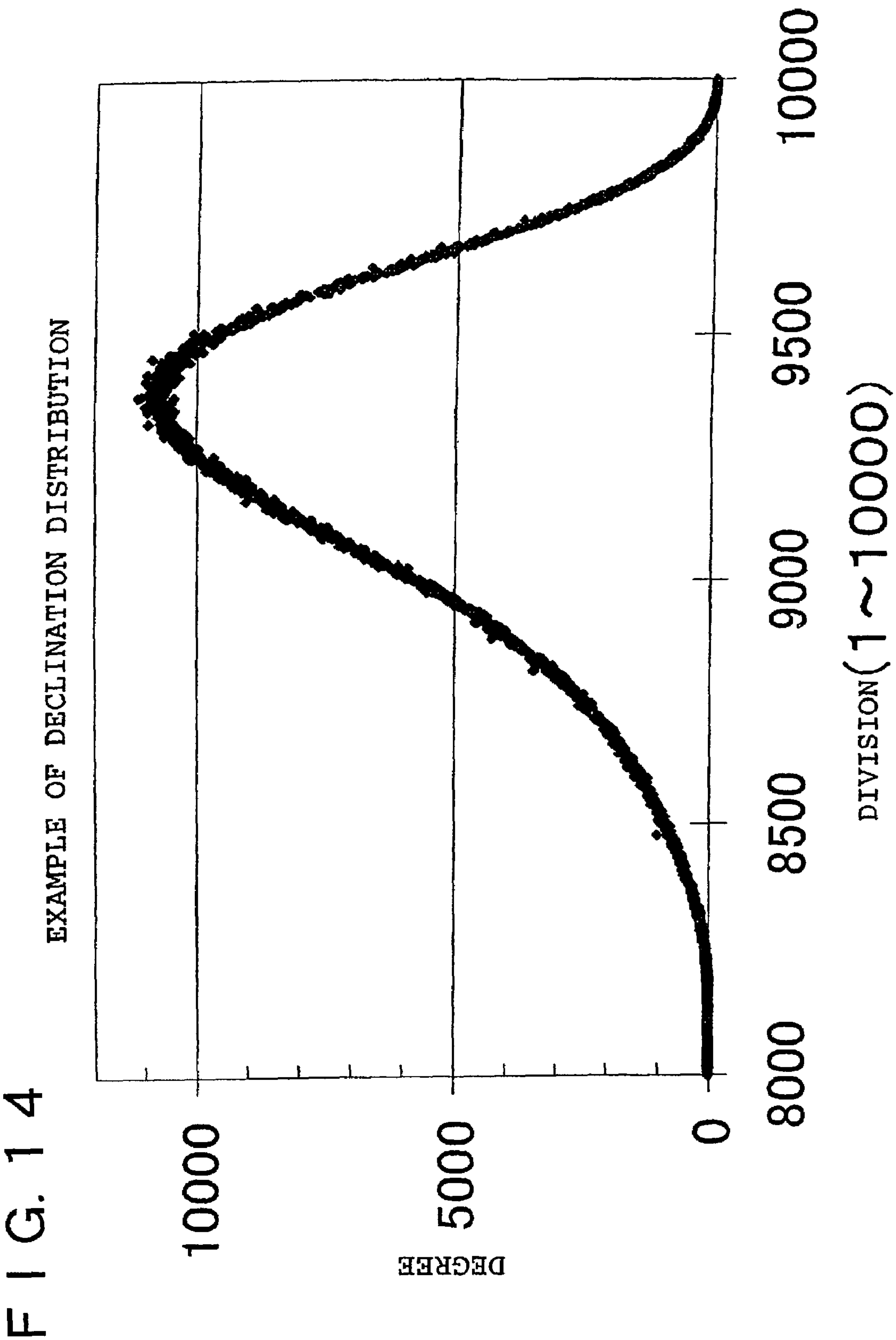
FIG. 14 is a characteristic diagram showing a declination distribution tabulation result example in the first and second embodiments, FIGS. 15A and 15B constitute integrally a list showing the content example of a norm division table in the first, second, third and fourth embodiments.

Subsequently in the step 1009 the inner product x is divided by the norm of the partial vector u, and cosine of the angle formed by the partial vector and region center vector is obtained, multiplied by 10000, converted into an integer, and accumulated in the corresponding division j of a declination distribution tabulation table Hc, so that the declination distribution is tabulated. FIG. 14 is an example of a graph of the declination distribution tabulated in this manner. The abscissa of the graph indicates the division number of the declination distribution tabulation table Hc, and the ordinates indicates a value of Hc[j] for each division number j, that is, the number of partial vectors having declinations in a declination range of the division j. Additionally in FIG. 14, since tabulated values of Hc of a division smaller than 8274 are all 0, only a division portion of 8000 to 10000 is shown. With the partial vector of b=0 of the first vector data of FIG. 12A, the following results:

$$j = int(10000 * 0.045687/0.049193)$$
$$= into(10000 * 0.928730) = 9287$$

After a variable b for selecting the partial vector, and a variable n for tabulating a total partial vector number are increased, it is judged in step 1010 whether or not all partial vectors of the noted vector data are processed. When the unprocessed partial vector remains, the flow returns to the step 1003 to process the next partial vector. When all the partial vectors are processed, it is judged in step 1011 whether or not all the vector data in the vector database 101 is processed. When the unprocessed vector data remains, the flow returns to the step 1002 to process the next vector data. When all the vector data is read and processed, the flow advances to steps 1012 to 1018 to prepare the norm division table and declination division table.

In the step 1012 an operation variable is initialized, and in the steps 1013 to 1018 a processing is performed to prepare division data of the norm division table and declination division table. In the step 1013, a total value x of the number of partial vectors having norms of 0 to r_sup*j/10000 in norm tabulation results, and a total value y of the number of partial vectors having declinations of 0 to j/10000 in declination tabulation results are obtained.

It is judged in the step 1014 whether or not a ratio x/n of the number of the partial vectors having norms of 0 to r_sup*j/10000 to the total partial vector number is larger than a ratio of k/256 of the number of divisions to a k-th division among 256 divisions of the norm division table. When the ratio is larger, the flow advances to step 1015 to set a boundary value R[k] of the k-th division of the norm division table to r_sup*j/10000. FIGS. 15A, 15B constitute integrally an example of the norm division table prepared from the norm distribution tabulation table Hr of the norm distribution of FIG. 13 as described above. It is seen that a division of 0.1 to 0.2 with the distribution concentrated therein is finely divided.

In steps 1016 and 1017, for the declination division, a boundary value of an m-th division of the declination division table is similarly determined. It is judged in step 1018 whether or not all norm tabulation results and declination tabulation results are processed. When an unprocessed tabulation result remains, the flow returns to the step 1013 to continue the processing. When all the tabulation results are completely processed, the flow advances to step 1019 to obtain R[0 . . . 256] and C[0 . . . 4] as the norm division table and declination division table, respectively, thereby ending the first step of the vector index preparation. FIG. 16 shows an example of the declination division table prepared from the declination distribution tabulation table Hc of the declination distribution of FIG. 14 as described above. It is seen that the vicinity of 0.95 with the distribution concentrated therein is finely divided.

(Second Step of Vector Index Preparation)

In a second step of vector index preparation, the processing described in steps 1101 to 1109 is performed, and index registration data is prepared from individual partial vectors. First, in the step 1101, the search tree T is initialized, and the number of pieces of T registration data is set to 0. For the search tree, 1) An integer value can be used as a key to register vector data (i, u), that is, a set of an integer and eight floating point numbers.

2) A range of integer values during registration can be used as the key to search the registered data. As long as the above two conditions are satisfied, (equilibrium) search trees such as B tree and binary search tree described in textbooks such as "Algorithm No. 2 Search/Character String/Calculation Geography" authored by R. Segiwick, translated by Kohei Noshita et al. and published by Kindai Kagaku K.K. (1992) and "Algorithm and Data Structure Handbook" authored by G. H. Gonnet, translated by Mitsuo Gen et al. and published by Keigaku Shuppan (1987) can be used.

In the step 1102, one piece of vector data is read from the vector database 101, the partial space number b is increased in order from 0 and the partial vector of each partial space is processed. In the step 1103, the partial vector u is prepared, the prepared norm division table 104 is searched, and the number r of the norm division for the norm |u| is obtained. In the steps 1104 to 1108, the same processing as that of the steps 1004 to 1008 of FIGS. 5A, 5B is performed, the number d of the vector having the largest inner product with the partial vector u among 6560 region center vectors and the value x of the inner product are obtained.

In the step 1109, the prepared declination division table 107 is searched, and the number c of the declination division for declination (i.e., cosine of the angle formed by the partial vector and region center vector of the belonging region) x/|u| is obtained. In the step 1110, the index data calculation means 110 converts four integer values of the partial space number b, region number d, declination division number c, and norm division number r to one integer value from the norm division number d and declination division number c obtained as described above, and calculates the key k during registration into the search tree by the following equation.

$$\begin{aligned} k &= b*N_d*N_c*N_r + d*N_c*N_r + c*N_r + r \\ &= b*7617440 + d*1024 + c*256 + r \end{aligned}$$

In step 1111 the calculation means calculates the index registration data (k, i, u) from the key k and partial vector data (i, u). Additionally, $N_d$ denotes a total region number of 6560, $N_c$ denotes a declination division number of 4, and $N_r$ denotes a norm division number of 256. In this manner, in the second step of the vector index preparation, the index registration data (k, i, u) for each partial vector of each vector data can efficiently be prepared (in a time proportional to the vector data number).

(Third Step of Vector Index Preparation)

Figure 6B:
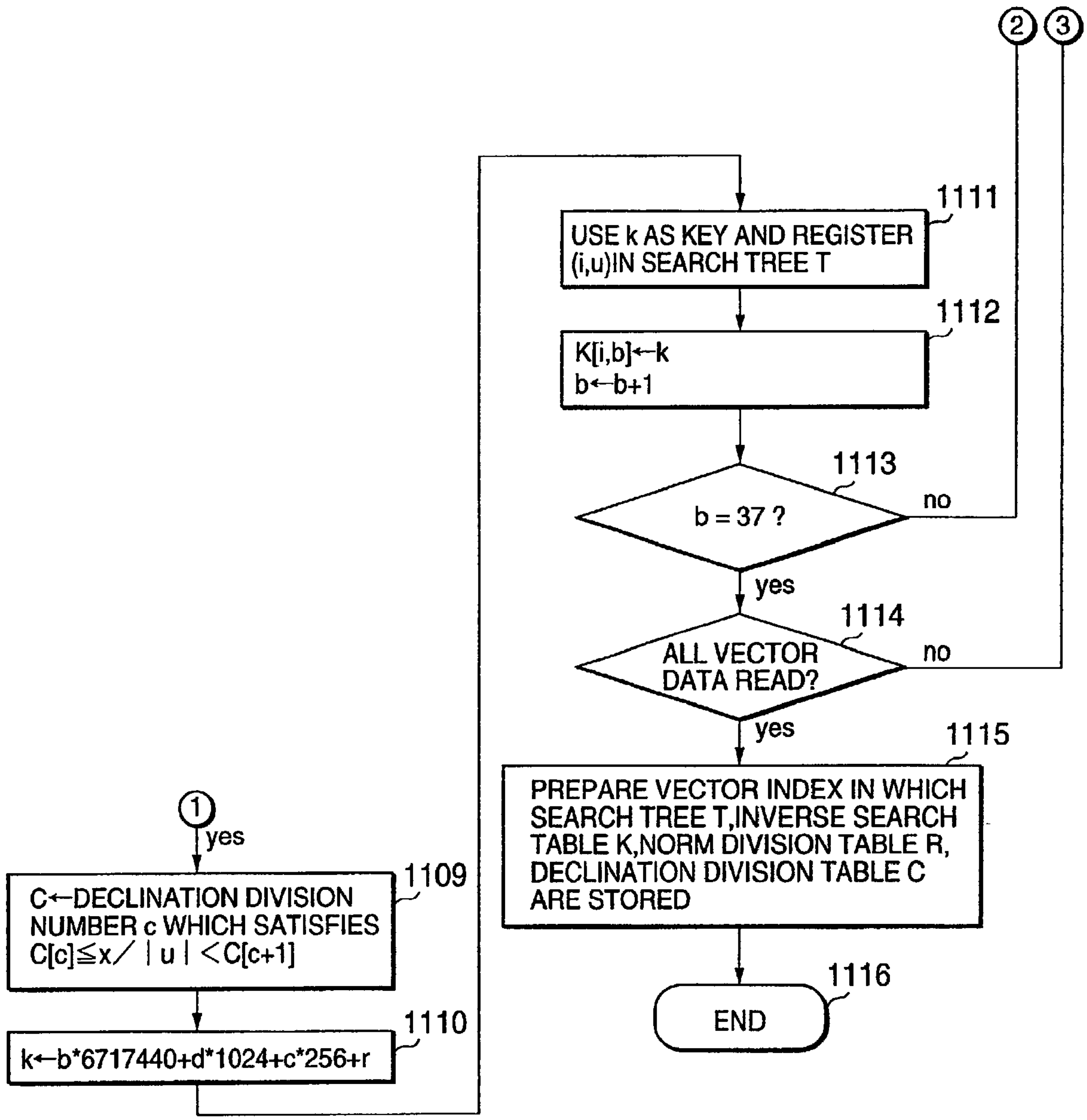

In a third step of the vector index preparation, a processing described in steps 1111 to 1115 of FIG. 6B is performed to prepare the vector index from the index registration data. First in the step 1111, k in the index registration data (k, i, u) is used as the key to (add) register data (i, u) into the search tree. Next in the step 1112, the key k is stored in element K[i, u] corresponding to the partial space number b of the vector data of the identification number i of an inverse search table K. After increasing the partial space number b by 1, it is judged in the step 1113 whether or not the processing of all partial spaces is finished. When the unprocessed partial space remains, the flow returns to the step 1103 to process the next partial vector. When the processing of all the partial spaces is finished, the flow advances to the step 1114. It is judged in the step 1114 whether or not all the vector data in the vector database 101 is processed. When the unprocessed vector data remains, the flow returns to the step 1102 to process the next vector data. When the processing of all the vector data is finished, the flow advances to the step 1115 to prepare the vector index with the search tree T, inverse search table K, norm division table R, and declination division table C stored therein, thereby completing the vector index preparation.

As described above, according to the vector index preparing method and apparatus of the first embodiment of the present invention, the following superior effects are produced.

1) The 296-dimensional vector is decomposed into 37 types of 8-dimensional partial vectors, a vector direction is precisely quantized with a set of the region number of the belonging region out of 6560 regions and the declination division number for the respective partial vectors, a vector size is quantized with the norm division number, a plurality of keys are encoded to obtain one integer value and the value is registered in the search tree, so that a high-speed high-precision range search is enabled for each partial space.

2) Moreover, since the inverse search table is prepared/disposed, a function of designating the identification number of the vector data and obtaining the vector component can be realized without doubling the component data. Therefore, the original vector database 101 becomes unnecessary during searching, and a storage capacity of the searching apparatus can be reduced.

3) In the norm division tabulation means and declination distribution tabulation means, a division boundary is determined in such a manner that the number of partial vectors belonging to each division is set to be as uniform as possible. Therefore, even with the vector database having a deviation in the distribution, an optimum vector index (with a minimized reduction of search speed) can constantly be prepared.

4) A vector set whose component is any one of {0, +1, −1} and which is obtained by normalizing all vectors excluding 0 vector is used as the region center vector. Therefore, the belonging region of each partial vector can be calculated without depending on the region number. An amount of calculations such as the calculation of the absolute value order of the partial vector component, and the addition of component absolute values is remarkably small. Therefore, even with a large-scaled vector database constituted of several tens to several hundreds of pieces of vector data, the vector index can be prepared in a practical processing time.

<Second Embodiment>

A second embodiment of the present invention will next be described with reference to the drawings.

(Constitution of Vector Index Preparing Apparatus)

Figure 2:
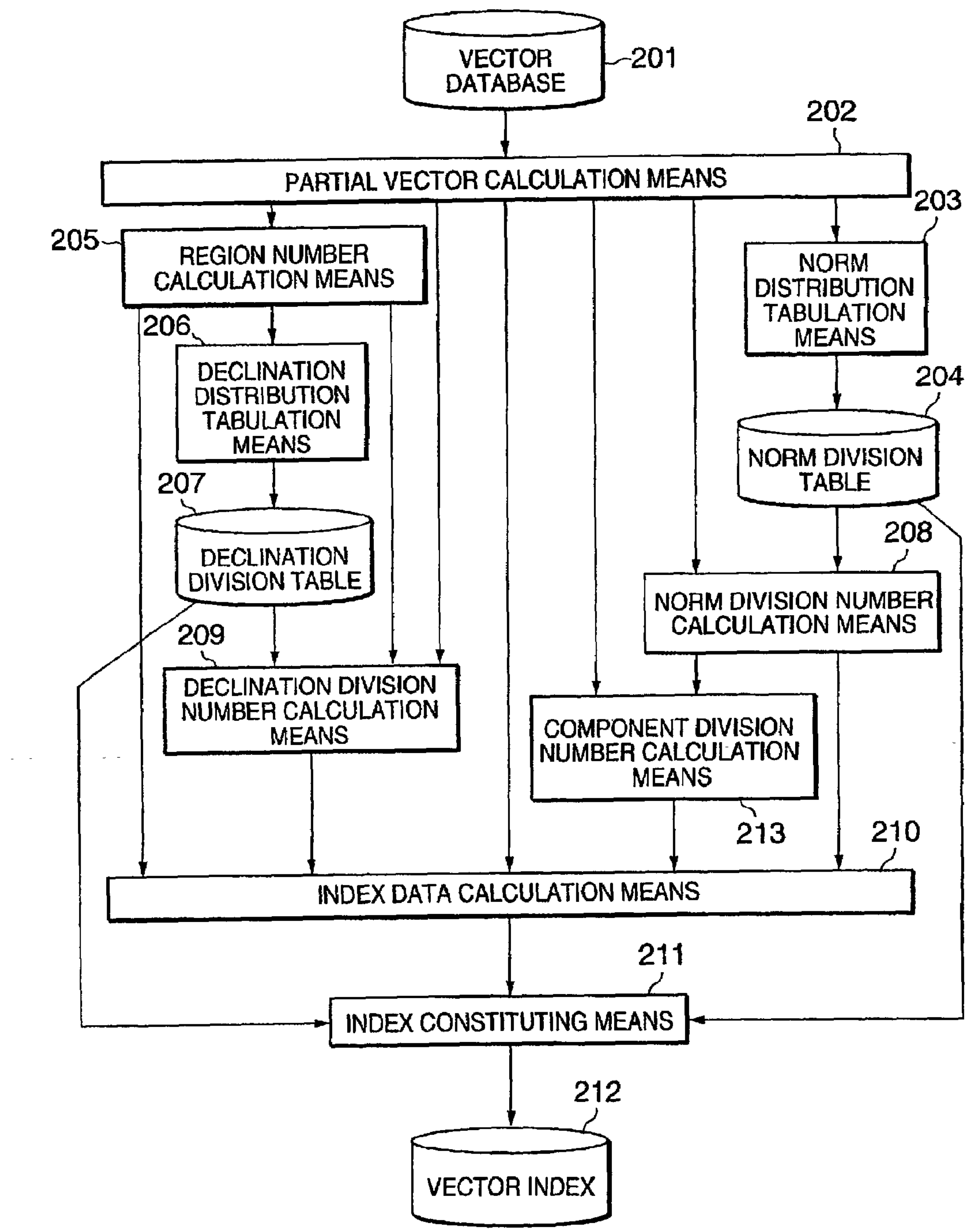
FIG. 2 is a block diagram showing the whole constitution of the vector index preparing apparatus in a second embodiment.

FIG. 2 is a block diagram showing the whole constitution of the second embodiment of the vector index preparing apparatus according to claims 2, 3 to 8, 15, 16 to 21 of the present invention. In FIG. 2, a vector database 201 stores 200,000 pieces of vector data constituted of three items of; the 296-dimensional unit real vector prepared from the newspaper article full text database of 200,000 collected newspaper articles and indicating the characteristic of each newspaper article; the identification number of 1 to 200,000; and an article subtitle, and has a content as shown in FIGS. 12A, 12B.

Partial vector calculation means 202 calculates 37 types of 8-dimensional partial vectors $v_0$ to $v_{36}$ and the partial space number b of 0 to 36 with respect to the 296-dimensional vector V of each vector data in the vector database 201.

Norm distribution tabulation means 203 calculates Euclidean norm of the respective 37 partial vectors calculated by the partial vector calculation means 202 for 200,000 pieces of vector data, tabulates the distribution, and determines the norm division as the range of 256 continuous real numbers:

Norm division 0=[0, r1),

Norm division 1=[r1, r2),

. . .

Norm division 255=[r255, r256)

A norm division table 204 stores the norm division calculated by the norm distribution tabulation means 203.

Region number calculation means 205 normalizes the 8-dimensional vector whose component is any one of {0, 1, −1} and which is not 0 vector to obtain a norm of 1 with respect to each 8-dimensional partial vector v calculated by the partial vector calculation means 202.

Region center vector 0=(0, 0, 0, 0, 0, 0, 0, 1), region center vector 1=(0, 0, 0, 0, 0, 0, 0, −1), region center vector 2 =(0, 0, 0, 0, 0, 0, 1, 0), region center vector 3=sqrt(1/2)*(0, 0, 0, 0, 0, 0, 1, 1), region center vector 4=sqrt(1/2)*(0, 0, 0, 0, 0, 0, 1, −1), region center vector 5=(0, 0, 0, 0, 0, 0, −1, 0), region center vector 6554=sqrt(1/7)*(−1, −1, −1, −1, −1, −1, 1, 0), region center vector 6555=sqrt(1/8)*(−1, −1, −1, −1, −1, −1, 1, 1), region center vector 6556=sqrt(1/8)*(−1, −1, −1, −1, −1, −1, 1, −1), region center vector 6557=sqrt(1/7)*(−1, −1, −1, −1, −1, −1, −1, 0), region center vector 6558=sqrt(1/8)*(−1, −1, −1, −1, −1, −1, −1, 1), region center vector 6559=sqrt(1/8)*(−1, −1, −1, −1, −1, −1, −1, −1).

The aforementioned 6560 vectors (additionally, "sqrt(x) indicates a square root of x") are obtained as the region center vectors, the region center vector $P_d$ whose inner product with the partial vector v is largest is obtained, number d is used as the region number of the belonging region of v, and cosine of the angle formed by $p_j$ and v is obtained as the declination c.

Declination distribution tabulation means 206 tabulates the distribution of the declination value c calculated by the region number calculation means 205 for 37 partial vectors of 200,000 pieces of vector data, and determines the declination division as the range of four continuous real numbers:

declination division 0=[c0, c1), declination division 1=[c1, c2), declination division 2=[c2, c3), declination division 3=[c3, c4).

A declination division table 207 stores the declination division calculated by the declination distribution tabulation means 206.

Norm division number calculation means 208 searches the norm division table 204 to determine the norm division number r to which the norm of each partial vector calculated by the partial vector calculation means 202 belongs.

Declination division number calculation means 209 searches the declination division table 207 to determine the declination division number c to which declinations of v and p belong from each partial vector v calculated by the partial vector calculation means 202 and the region center vector p calculated by the region number calculation means 205 for v.

Index data calculation means 210 prepares the following key for search from the partial vector $V_b$ and partial space number b calculated by the partial vector calculation means 202, region number d calculated by the region number calculation means 205, declination division number c calculated by the declination division number calculation means 209, and norm division number r calculated by the norm division number calculation means 208:

$$K=((b*6560+d)*4+c)*256+r;$$

and calculates a set (K, i, y) of the key K, identification number i of the partial vector and component division number $y_j$ as the index data.

Index constituting means 211 uses the key K from the index data (K, i, y) calculated by the index data calculation means 210, and constitutes an index in which the search tree for searching (i, y), the inverse search table with the second key $$L=(d*4+c)*256+r$$

stored therein from the region number d, declination division number c and norm division number r with respect to the set of each identification number i and each partial space number b, norm division table 204 and declination division table 207 are stored.

A vector index 212 stores the search tree, inverse search table, norm division table 204 and declination division table 207 prepared by the index constituting means 211. Additionally, the constituting elements 201 to 212 correspond to the constituting elements 101 to 112 of FIG. 1, and particularly the constituting elements 201 to 209 are the same as the constituting elements 101 to 109 of FIG. 1.

Component division number calculation means 213 calculates component division numbers $y_0$ to $y_7$ in a range of 0 to 255 from the partial vector $v_b$ calculated by the partial vector calculation means 202, norm division number calculated by the norm division number calculation means 208, and each component value of the partial vector.

(Operation of Vector Index Preparing Apparatus)

(First Step of Vector Index Preparation)

The operation of the vector index preparing apparatus constituted as described above will be described with reference to the drawings. The procedure of the preparation processing of the norm division table R and declination division table C in a first step of the vector index preparation is the same as the procedure in the first embodiment with the same vector database, the contents of the prepared norm division table R and declination division table C are both the same as the contents of the norm division table R and declination division table C in the first embodiment, and the description thereof is therefore omitted.

(Second, Third Steps of Vector Index Preparation)

Figure 7A:
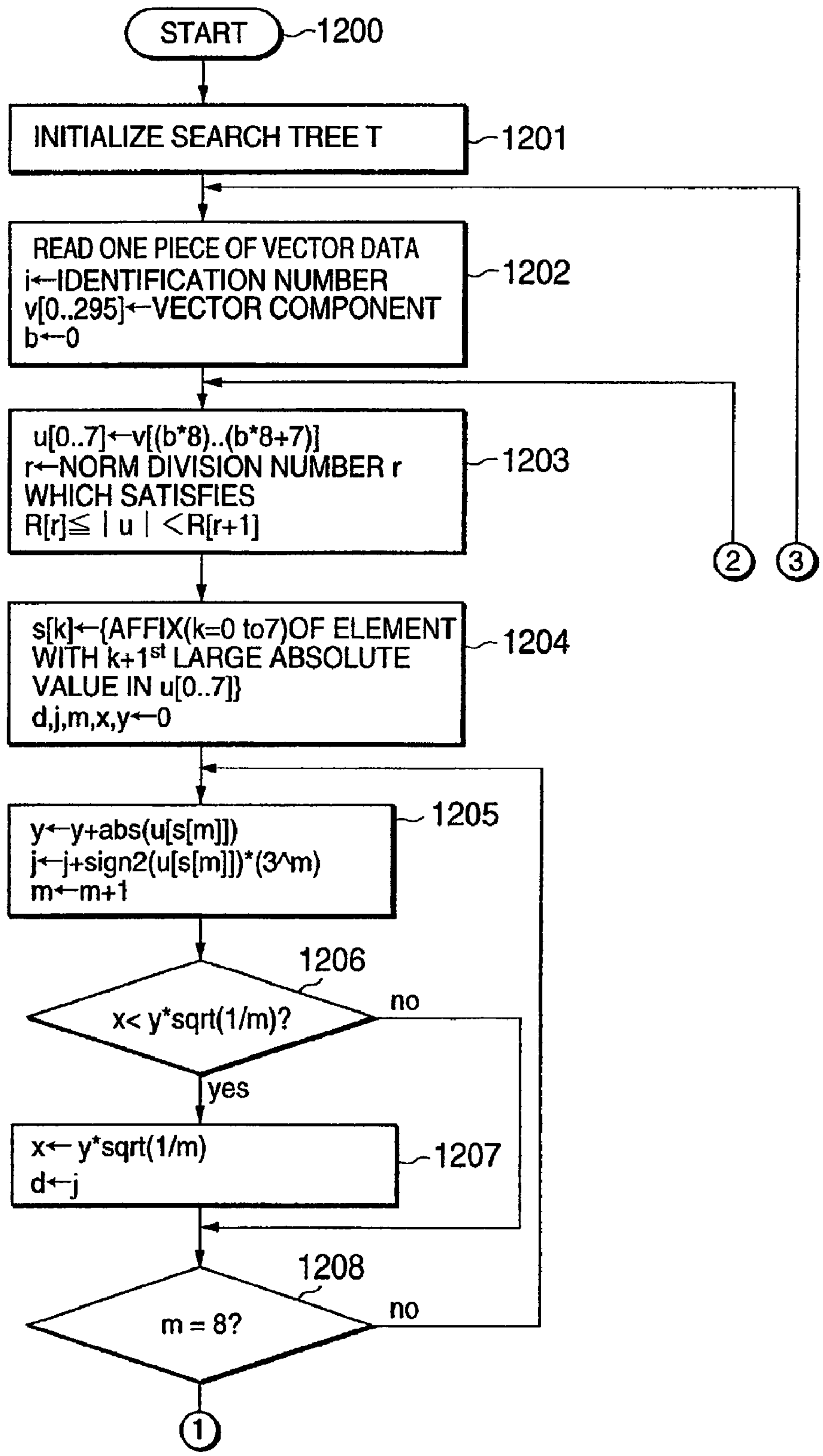
Figure 7B:
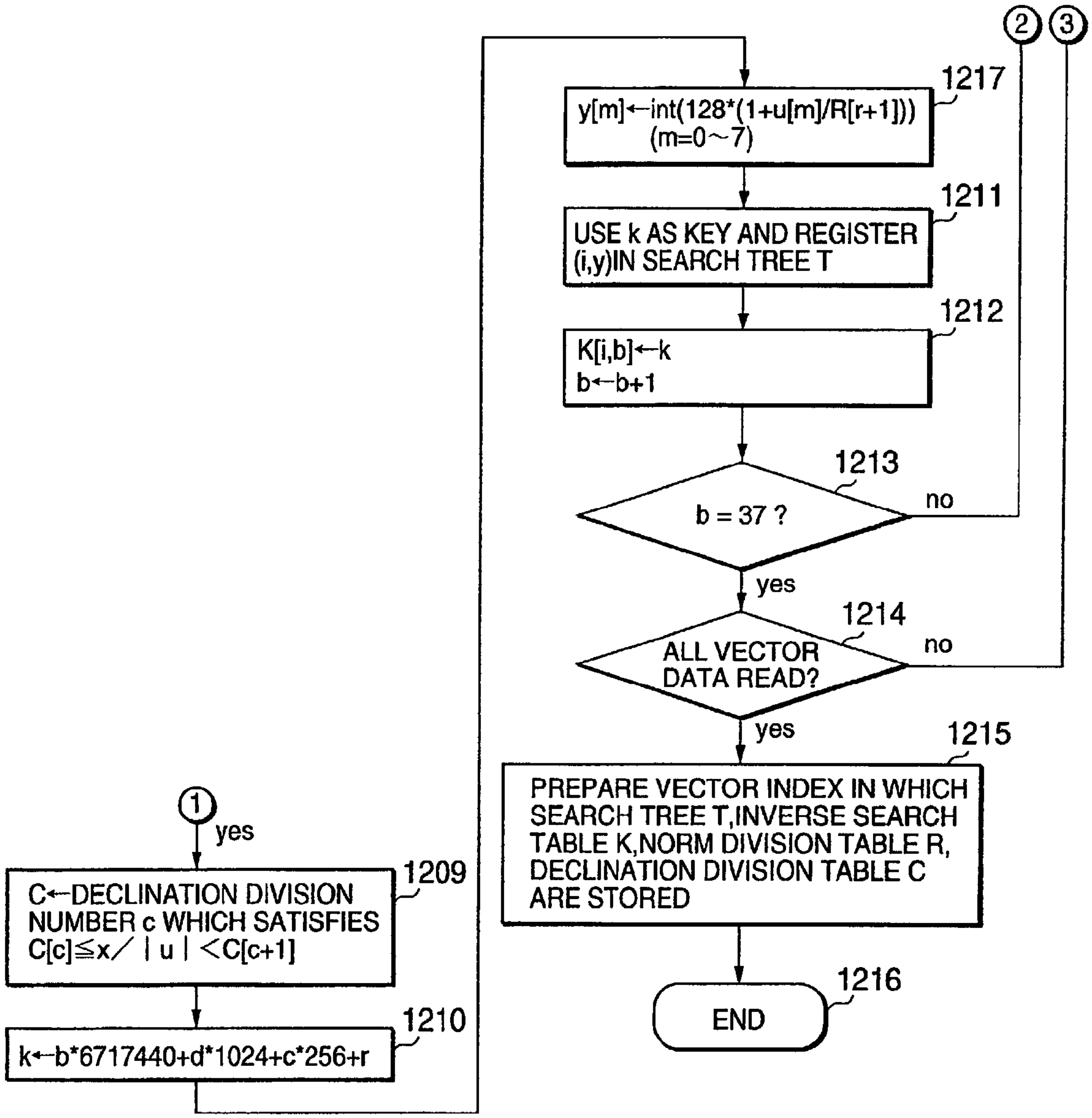

FIGS. 7A and 7B constitute integrally a flowchart showing the processing procedure of index registration data calculation and vector index preparation in second and third steps of the vector index preparation. Steps 1200 to 1216 of FIGS. 7A and 7B correspond to the steps 1100 to 1116 of FIGS. 6A and 6B, particularly the respective steps other than the steps 1211, 1215, 1217 are the same in processing as the corresponding steps of FIGS. 6A and 6B, and the description thereof is therefore omitted.

In the step 1217, a component division number y[0 . . . 7] for each component of u is calculated from partial vector u[0 . . . 7]. Since abs(u[m])≦|u|<R[r+1] for any u[m], the following is established.

$$-1<u[m]/R[r+1]<+1$$

The component division number y[m] is an integer value of 0 to 255, which can be represented by eight bits. In the step 1211, y is used instead of u, and k is used as the key to register integer data (i, y) in the search tree T. Since each y[m] can be represented by eight bits, the capacity of the search tree T is remarkably reduced as compared with when u[m] is registered in the form of a floating point. In the step 1215, since the vector index including the search tree T prepared in this manner is prepared, the capacity of the resulting and prepared vector index can be small as compared with when u(m) is registered.

Additionally, in the second embodiment, each component u[m] is approximated with the 8-bit integer value y[m] in the step 1217. However, when a precision becomes insufficient with eight bits during similarity searching, the data may be represented and registered by 9 to 24 bits to obtain a sufficient precision.

As described above, according to the vector index preparing method and apparatus of the second embodiment of the present invention, the following superior effects are produced.

1) The 296-dimensional vector is decomposed into 37 types of 8-dimensional partial vectors, the vector direction is precisely quantized with a set of the region number of the belonging region out of 6560 regions and the declination division number for the respective partial vectors, the vector size is quantized with the norm division number, and additionally each component of the partial vector is quantized based on the norm division such as the component division number. The plurality of keys are encoded to obtain one integer value and the value is registered in the search tree together with the component division number of the partial vector as an approximation result, so that the high-speed high-precision range search is enabled for each partial space.

2) Moreover, since the inverse search table is prepared/disposed, the function of designating the identification number of the vector data and obtaining the vector component can be realized without doubly disposing the component data. Therefore, the original vector database 101 becomes unnecessary during searching, and the storage capacity of the searching apparatus can be reduced.

3) In the norm division tabulation means and declination distribution tabulation means, the division boundary is determined in such a manner that the number of partial vectors belonging to each division is set to be as uniform as possible. Therefore, even with the vector database having a deviation in the distribution, the optimum vector index (with a minimized reduction of the search speed) can constantly be prepared.

4) The vector set whose component is any one of {0, +1, −1} and which is obtained by normalizing all the vectors excluding 0 vector is used as the region center vector. Therefore, the belonging region of each partial vector can be calculated without depending on the region number. The amount of calculations such as the calculation of the absolute value order of the partial vector component, and the addition of component absolute values is remarkably small.

Therefore, even with the large-scaled vector database constituted of several tens to several hundreds of pieces of vector data, the vector index can be prepared in the practical processing time.

5) The capacity of the vector index to be prepared can remarkably be reduced.

(Third Embodiment)

A third embodiment of the present invention will next be described with reference to the drawings.

(Constitution of Similar Vector Searching Apparatus)

Figure 3:
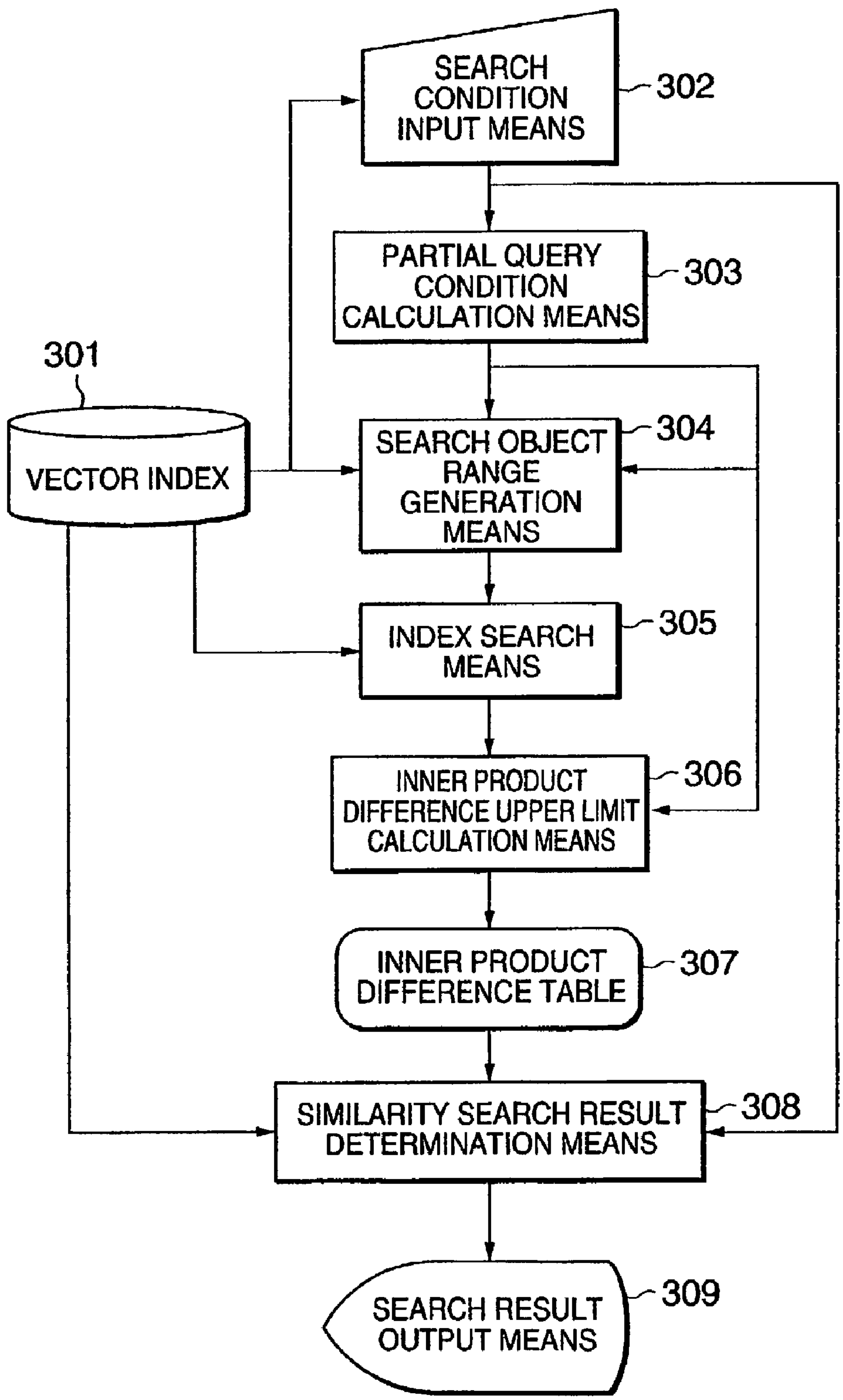
FIG. 3 is a block diagram showing the whole constitution of a similar vector searching apparatus in a third embodiment.

FIG. 3 is a block diagram showing the whole constitution of a similar vector searching apparatus according to claims 9, 11, 12, 22, 24, 25 of the present invention. In FIG. 3, a vector index 301 is prepared by the vector index preparing apparatus of the aforementioned first embodiment, and is a vector index prepared from the vector database which stores 200,000 pieces of vector data constituted of two items of: the 296-dimensional real vector prepared from the newspaper article full text database of 200,000 collected newspaper articles and indicating the characteristic of each newspaper article; and the identification number of 1 to 200,000 for uniquely identifying each article and which has the content as shown in FIGS. 12A, 12B.

In order to perform similarity search on the newspaper article full text database, search condition input means 302 inputs the identification number of any article in the newspaper article full text database, and a similarity lower limit value and maximum obtained pieces number of 0 to 100 indicating a similarity search range, searches the vector index 301 with the identification number to obtain a vector of the corresponding article as a query vector Q from the inputted identification number, and obtains an inner product lower limit value et from the similarity lower limit value.

Partial query condition calculation means 303 calculates a partial inner product lower limit value f as a lower limit value of an inner product of 37 types of 8-dimensional partial query vectors q with the partial vector corresponding to q by $f=\alpha|q|^2/|Q|^2$ with respect to partial spaces of 0 to 36 for the query vector Q obtained by the search condition input means 302.

Search object range generation means 304 enumerates all sets (d, c, [$r_1$, $r_2$]) of the region number d for specifying a region including a partial document vector whose partial inner product with the partial query vector q is possibly larger than the partial inner product lower limit value f, declination division number c, and norm division range [$r_1$, $r_2$] from the partial query vector q and partial inner product lower limit value f obtained by the partial query condition calculation means 303 for the partial space b and the norm division table and declination division table in the vector index 301.

Index search means 305 calculates search condition K for the vector index 301 from (d, c, [$r_1$, $r_2$]) generated by the search object range generation means 304 for each partial space b similarly as calculation of the key during vector index preparation as follows.

$$K=[k_{min}, k_{max}]$$

$$k_{min}=b*7617440+d*1024+c*256+r_1$$

$$k_{max}=b*7617440+d*1024+c*256+r_2$$

The index search means then searches the range of the vector index 301 with the search condition K and obtains all sets (i, v) of partial vector v and identification number i having a key to match the search condition.

Inner product difference upper limit calculation means 306 calculates a partial inner product difference value t from the set (i, v) of the partial vector v and identification number i obtained by the index search means 305 and the partial query vector q and partial inner product lower limit value f obtained by the partial query condition calculation means 303 by $t=(v\cdot q)-f$, and accumulates (adds) the partial inner product difference value t to a table element S[i] having the identification number i as an affix. Thereby, the upper limit value of the inner product difference is calculated by subtracting the inner product lower limit value a from an inner product Q·V of the vector V of the vector data of the identification number i and query vector Q.

An inner product difference table 307 accumulates the upper limit value of the inner product difference calculated by the inner product difference upper limit calculation means 306, and refers to/stores an inner product difference value S[i] of the vector data of the identification number i.

Similarity search result determination means 308 searches the vector index 301 with the identification number i in order from a positive large inner product difference upper limit value S[i] in the element S[i] of the inner product difference table 307 to obtain the corresponding vector V, calculates an inner product difference value $V\cdot Q-\alpha$ by subtracting the inner product lower limit value a calculated by the search condition input means 302 from the inner product V·Q of V with the query vector Q calculated by the search condition input means 302, and replaces S[i] with the inner product difference value $V\cdot Q-\alpha$. The number of articles which have the inner product difference values larger than the maximum value of the partial inner product difference accumulated value of the article having the inner product difference value not calculated, and whose inner product difference is calculated reaches L or more. At this time, or at the time the inner product difference values of all the articles having positive partial inner product difference accumulated values are calculated, for L result candidates at maximum (i, S[i]) having positive and large inner product difference values, a set (i, S[i]+$\alpha$) of the identification number i and inner product S[i]+$\alpha$ is outputted as a search result to search result output means 309.

The search result output means 309 calculates and displays a similarity of the identification numbers of L newspaper articles at maximum to a range of 0 to 100 as a result of the similar vector search from the search result obtained by the similarity search result determination means 308.

(Operation of Similar Vector Searching Apparatus)

Figure 8A:
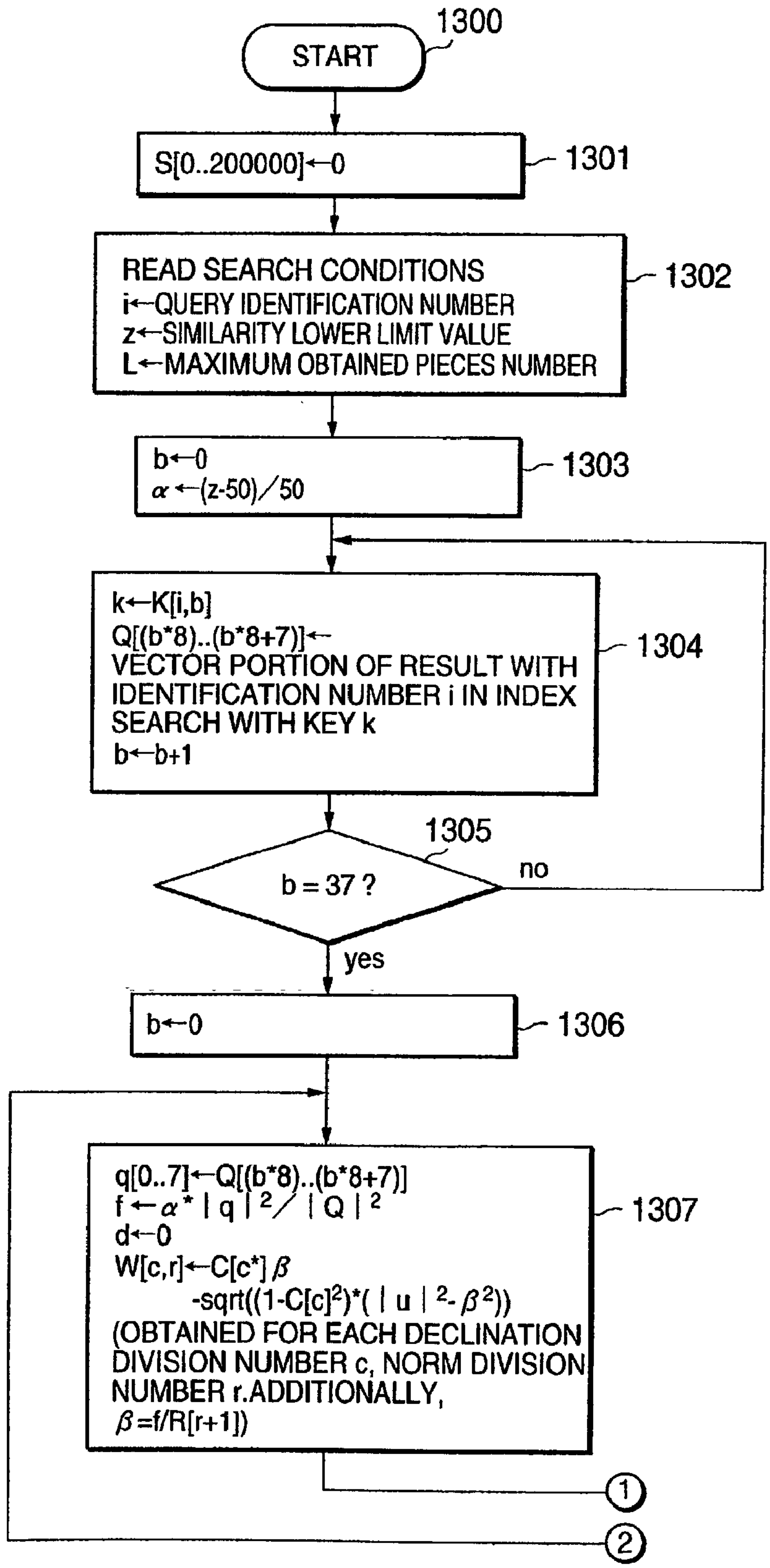
Figure 8B:
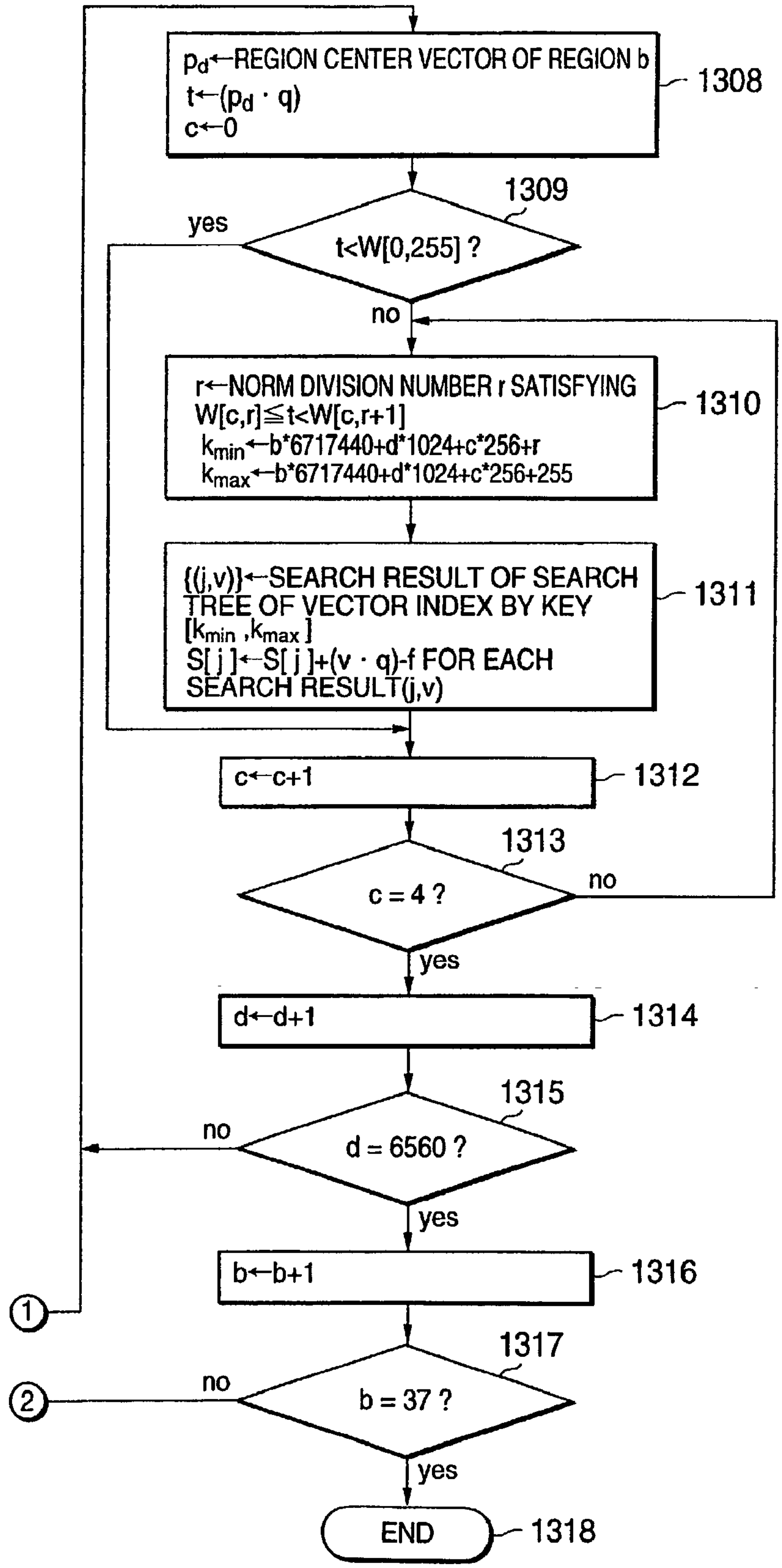
Figure 9:
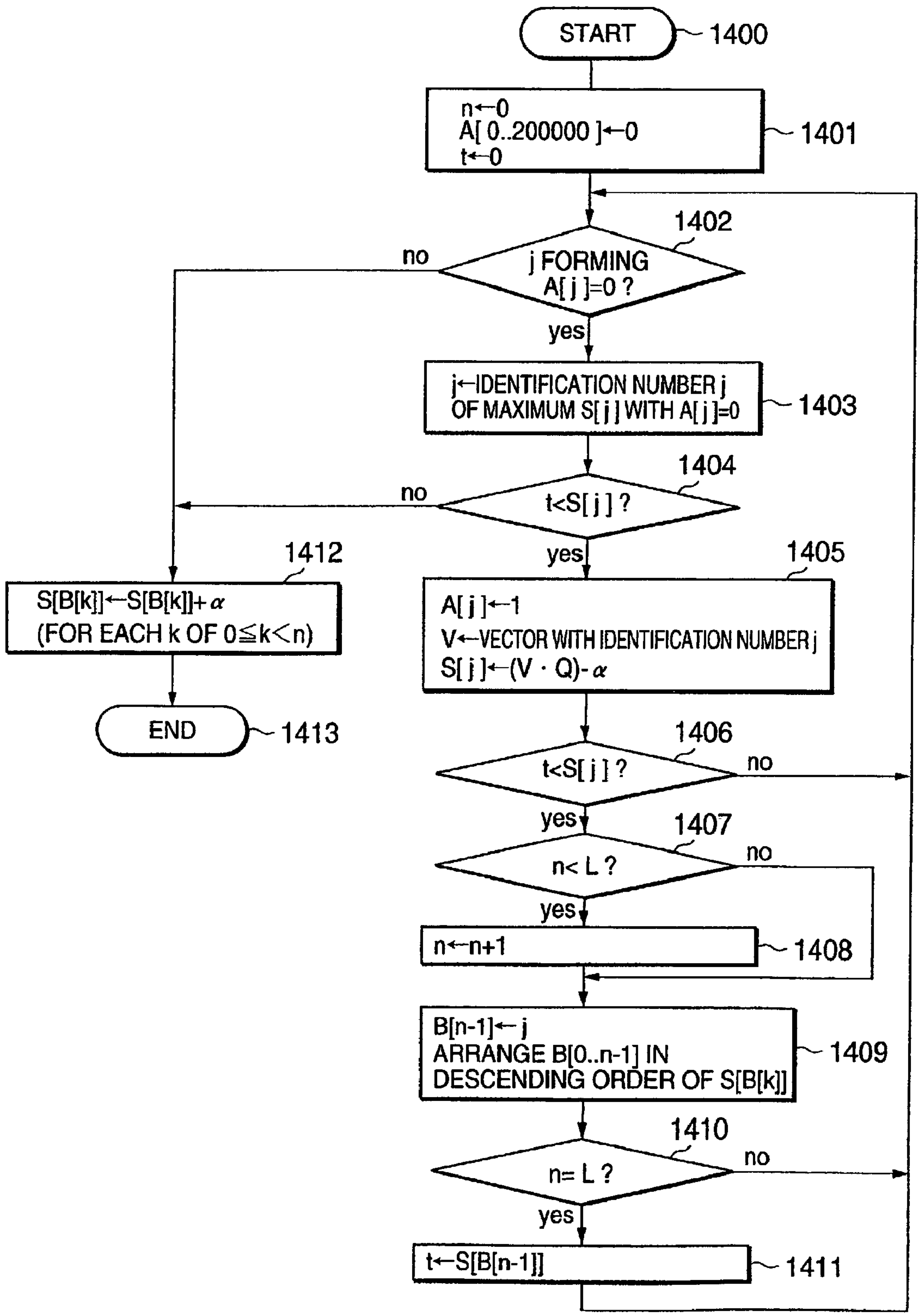
FIG. 9 is a flowchart showing the searching procedure of a second step of the similar vector search in the third embodiment, FIGS. 10A and 10B constitute integrally a flowchart showing the searching procedure of the first step for the similar vector search in the fourth embodiment, FIGS. 11A and 11B constitute integrally a flowchart showing the searching procedure of the second step of the similar vector search in the fourth embodiment, FIGS. 12A and 12B constitute integrally a list showing a content example of a vector database in the first, second, third and fourth embodiments.

Operation of the similar vector searching apparatus constituted as described above will be described with reference to the drawings. FIGS. 8A, 8B constitute integrally a flowchart showing a search processing procedure in a first step of similar vector search, and FIG. 9 is a flowchart showing the search processing procedure in a second step of the similar vector search. In the first step of the similar vector search, the partial query vector q and partial inner product lower limit value f are prepared from the search condition inputted from the search condition input means 302, and the vector index 301 is searched. The inner product difference upper limit value S[i] of each vector data, that is, a value obtained by subtracting the inner product lower limit value from the inner product with the query vector is obtained such that the value is less than S[i] in the inner product difference table 307. Subsequently, in a second step of the similar vector search, the inner product difference upper limit value obtained in the inner product difference table 307 in the first step is used as a clue. The similarity search result determination means 308 searches the vector component and obtains the inner product difference in order from the vector data which meets a search condition "the inner product with the query vector is larger than α" and whose inner product with the query vector is relatively large. The determination means continues its processing until a designated number of (i.e., L) or more pieces of vector data guaranteed to be larger in inner product difference value than any vector data having the inner product difference not obtained yet are collected, or until the inner product difference values of all the vector data meeting the search condition are obtained. The inner product is calculated from the obtained inner product difference value and a final result is outputted.

(First Step of Similar Vector Search)

A content of the similar vector search will be described hereinafter with reference to FIGS. 8A and 8B and FIG. 9 by means of an example in which an identification number 1, similarity lower limit value 90, and maximum obtained pieces number 10 are inputted as search conditions. Since the identification number is 1, the respective components of the 296-dimensional vector are obtained as shown in FIG. 12A. First in step 1301, 200,000 elements S[0] to S[200000] of an inner product difference table S are initialized/set to 0. Subsequently, the aforementioned search conditions are read from the search condition input means 302, and stored in i, Z, L, respectively.

After the partial space number b is initialized to 0 in step 1302, the inner product lower limit value α is calculated from a similarity lower limit value Z. This search condition results in α←(90−50)/50=0.8. In steps 1304, 1305, for each partial space, an inversion table K of the vector index 301 is used to obtain the key, the search table is searched to obtain the vector data, a vector portion of the data with the identification number of 1 is stored in Q, and thereby the query vector is obtained in Q[0 . . . 295]. After the partial space number is initialized in step 1306, the vector index is searched with respect to each partial space in steps 1307 to 1317 and the inner product difference upper limit value of each vector data is obtained in the inner product difference table 307.

In step 1307, partial query vector q[0 . . . 7] and partial inner product lower limit value f of the partial space number b are obtained, that is, the lower limit value of the inner product of the partial space partial vector data and q is obtained. With b=0, $|q|^2=0.221795$, $|Q|^2=1$, then the following results.

$$f=0.8*0.221795/1.0=0.177436$$

After the region number d is initialized to indicate 0, a table W for use in determining a search object range is prepared. When the table W is referred to with the declination division number c and norm division number r, and inner product p·q of a center vector p of the noted region with the region number d with the partial query vector q is less than W[c, r], the table is prepared in such a manner that the inner product of the partial vector v and partial query vector q of divisions (d, c, 0) to (d, c, r) is f or less. In this case, the partial vector of divisions (d, c, 0) to (d, c, r) does not satisfy the search condition (i.e., the partial inner product is larger than f) for the partial space, the search of these divisions can be omitted.

In order to obtain the table W, with the partial v closest to the partial query vector q in the region d, a case may be considered in which p, q, v are on one plane and angle ω formed by v and q is smallest in a range of declination division c. In this case, assuming that an angle formed by p and q is θ and that a maximum value of an angle formed by p and v is ϕ, the angle ω formed by v and q is ω=θ−ϕ, and the following relations are therefore used.

$$f<v\cdot q=|v|*|q|*\cos(\theta-\phi)<$$

$$R[r+1]*|q|*(\cos\theta*\cos\phi+\sin\theta\sin\phi)$$

$$C[c]=\cos\phi$$

$$\cos\theta=(p\cdot q)/|p|*|q|=(p\cdot q)/|q|$$

From the above, the following inequality satisfied by p·q is solved, and formula W[c, r] of step 1307 is obtained.

$$f<R[r+1]*C[c]*(p\cdot q)+R[r+1]*\mathrm{sqrt}(1-C[c]^2)*\mathrm{sqrt}(|q|^2-(p\cdot q)^2))$$

In this manner, a value of table W[c, r] can be determined only from norm |q| of the partial query vector without referring to actual components of partial vector v or depending on the region d. In the present embodiment, since the norm division table R and declination division table C are as shown in FIGS. 15A, 15B and 16, with b=0, the table W has a content as shown in FIGS. 17A and 17B. In the drawings, for an element with a table value of "9.99999", the norm is too small for the partial query vector q, and the inner product of even the partial vector v of any direction with q cannot reach f. This means that this norm division cannot be a search object. It is seen from FIGS. 17A and 17B that with c=0, that is, a large declination value, a broad range search is performed and that with c=3, that is, a small declination value, only a portion with a large norm, that is, a narrower range is searched.

In step 1308, the inner product t of the center vector p of the noted region with the partial query vector q is obtained, and a loop variable c for declination division is initialized to indicate 0. Subsequently, it is checked in step 1309 whether or not the inner product t is smaller than that of element W[0, 255] indicating the minimum value of the table W. When the inner product is smaller, it is defined that any partial vector using the region d as part of the key does not satisfy the search condition. Therefore, the flow jumps to step 1312. If not so, in step 1310 for the declination division c, a minimum value r of the norm division to be searched is obtained with the aid of the table W calculated in the step 1307. A search range [kmin, kmax] of the vector index 301 is obtained from this r, partial space number b, region number d, and declination division number c. In step 1311, this search range [kmin, kmax] is used as the key to search a range of the search tree, and the partial inner product difference value is calculated by subtracting the partial inner product lower limit value f from the inner product of the partial query vectors q and v for respective sets (j, v) of the identification number j and vector v included in a range search result, and is accumulated in the corresponding element S[j] of the inner product difference table 307.

For example, with b=0, d=4212, $$q=(+0.029259\ \ -0.016005\ \ -0.021118\ \ +0.024992\ \ -0.006860\ -0.009032\ -0.007255\ -0.007715),\text{and}$$

$$p_0=(+\tfrac{1}{2}, -\tfrac{1}{2}, -\tfrac{1}{2}, +\tfrac{1}{2}, 0, 0, 0, 0),$$

then the following results:

$$t=p\cdot q=+0.045687.$$

Since t is larger than W[0, 255]=−0.02527, the flow advances to step 1310. From the table W of FIGS. 17A and 17B, for the norm division number r in:

$$W[0, r]\leq t<W[0, r+1],$$

r=1. With c=0, the key of the search tree is as follows:

[kmin, kmax]=[0*6717440+4212*1024+0*256+1, 0*6717440+4212*1024+0*256+255]=[4313089, 4313343]

Since the partial vector with b=0 of the vector data with the identification number 1, that is, v=(+0.029259 −0.016005 −0.021118 +0.024992 −0.006860 −0.009032 −0.007255 −0.007715) is registered with the key=0*6717440+4212*1024+0*256+1=4313089, the vector is one of the range search results. The partial inner product difference value is:

$$(v \cdot q) - f = 0.221795 - 0.177436 = 0.044359.$$

Then, S[1]=0.044359.

Moreover, the partial vector with b=0 of the vector data with identification number 2, that is, v=(+0.029259 −0.016005 −0.021118 +0.024992 −0.006860 −0.009032 −0.007255 −0.007715) is registered with the key k=0*6717440+619*1024+2*256+2, and is included in the results of the range search with b=0, c=2, d=619. The partial inner product difference value is:

$$(v \cdot q) - f = 0.00005.$$

Then, S[2]=0.00005.

similarly, with b=1, the partial vector of the vector data with the identification number 2 is registered with the key k=1*6717440+2691*1024+1*256+93, and is included in the results of the range search with b=1, c=1, d=2691. For the partial inner product difference value, $$(v \cdot q) - f = 0.00217$$

is accumulated in S[2], and S[2]=0.00222.

In this manner, in steps 1312, 1313, while c is increased, the search range determination and search processing, and the calculation and accumulation of the inner product difference are performed for each declination division. Subsequently, in steps 1314 and 1315 while the region number d is successively increased to 6560, each region is subjected to a processing of steps 1308 to 1313. Furthermore, in steps 1316 and 1317 while the partial space number is successively increased to 37, each partial space is subjected to a processing of steps 1307 to 1315, and the first step of the similar vector search is finished. In this stage, in the inner product difference table 307, for the vector data V with each identification number, a difference between the inner product V·Q with the query vector Q and the inner product lower limit value α, that is, an estimated value upper limit of inner product difference value (V·Q)−α is obtained. Because in the respective partial spaces b, for the partial vector whose inner product with the partial query vector q is larger than the partial inner product lower limit value f, the partial inner product difference value is obtained without exception. Therefore, the partial inner product difference value of the vector data whose partial inner product difference value is not obtained must indicate a negative value. This negative value is replaced with 0 and accumulated ("inner product difference table is not changed" is equivalent to accumulation of 0), and therefore the accumulation result of the partial inner product difference value is one of the inner product difference upper limit values which press the inner product difference value from above. After the inner product difference table 307 is obtained as described above, a second step of the similar vector search is executed, and the final search result is obtained.

(Second Step of Similar Vector Search)

A processing procedure of the second step will next be described with reference to a flowchart of FIG. 9. In step 1401 the number of candidates satisfying the search conditions of the present time is cleared to indicate 0, and a flag A[0 . . . 200000] indicating whether or not the inner product difference of the vector data is obtained is initialized/set to 0, that is, "no inner product difference is obtained". Moreover, the minimum value (=threshold value) t of the inner product difference value among the candidates satisfying the search conditions at the present time is initialized to indicate 0.

It is checked in step 1402 whether there is non-inspected vector data, that is, vector data with the inner product difference thereof non-obtained. When the inner product differences of all the vector data are obtained, the flow jumps to step 1412. Additionally, when the inner product lower limit value given as the search condition is 0 or more, and when a deviation in the distribution of the respective components of the vector data is small, condition indicates "no" in the step 1404 far before obtaining the inner product differences of all the vector data. Therefore, "no" does not result from the step 1402 under usual search conditions.

In step 1403 obtained is the identification number j of the vector data in which A[j] is 0, that is, value S[j] of the inner product difference table is maximized in the non-inspected vector data. The processing of this step can efficiently be executed by arranging the inner product difference table 307 in a descending order of the inner product difference value or by representing the table by data structures such as heap.

In step 1404, the previously obtained t is cared with S[j]. If S[j] is t or less, it is defined that no vector data exceeding the inner product difference values of n candidates of the present time exists in the non-inspected vector data. Therefore, the flow jumps to step 1412 to calculate the result from the candidates of the present time, and finish the search processing. When t is larger than S[j], in the step 1405 the flag A[j] of the noted vector data is changed to 1, it is recorded "the inner product difference is obtained", and the vector index 301 is searched to obtain the vector V with the identification number j. Moreover, the inner product difference value (V·Q)−α with the query vector V is obtained, and the upper limit value in the corresponding element S[j] of the inner product difference table 207 is replaced with a correct inner product difference value. When there is an allowance in the storage region, the inner product difference table may be recorded in a new table without being replaced.

In step 1406, the replaced S[j] is again compared with t. When S[j] is larger than t, steps 1407 to 1414 are executed and the vector data with the identification number j is added to the candidates. It is judged in the step 1407 whether L candidates are already obtained at this time. When the L candidates are not obtained, the number n of candidates is increased in the step 1408. In the step 1409, after j is registered as the final candidate (candidate lowest in inner product difference among the candidates) of arrangement B of the candidate identification numbers, B[0 . . . n-1] is arranged in the descending order of S[B[k]]. When the candidate number n reaches L in the step 1410, the threshold value t is updated in the step 1411, and the flow returns to the step 1402 to continue the processing.

If judgment is "no" in the step 1402 or 1404, the flow goes out of the aforementioned loop and advances to step 1412. In the step 1412, the inner product value is obtained by adding α to the already obtained inner product difference value S[B[k]] with respect to each of n (L at maximum) candidate identification numbers B[0] to B[n-1]. For each k of 0 to n-1, a set (B[k], S[B[k]]) of a result number B[k] of the vector data having k-th large inner product, and the value S[B[k]] of the inner product with the query vector V is outputted as the final result of the similar vector search, and the similar vector search is finished.

When the value of the inner product lower limit in the search conditions is 0.5 or more and sufficiently large, there is no large deviation in the vector data distribution, and the number of pieces of vector data having the inner product not less than the inner product lower limit $\alpha$ is sufficiently larger than the obtained pieces number L, the loop of the steps 1402 to 1411 is repeated about several times the obtained pieces number L. In this case, the judgment of the step 1404 is "no", the number of pieces of vector data for actually searching the vector to obtain the inner product is very small, and it is possible to efficiently obtain the final result. Additionally, this characteristic is established even when L indicates about several hundreds. Therefore, in the search conditions with a relatively large L, a processing efficiency is remarkably enhanced as compared with a conventional similar vector searching method in which a practical search speed can be obtained only with L indicating several pieces at most.

As described above, according to the similar vector searching method and apparatus of the third embodiment of the present invention, for the vector database of a large number of pieces of collected vector data with the vector of several hundreds of dimensions, a high-speed similarity search of the type "most similar L pieces of vector data are obtained" is possible. Furthermore, even when L is relatively large (several tens to several hundreds), the search processing is not excessively delayed. A similarity search range such as "inner product value of 0.8 or more" can be designated. There can be provided superior similar vector searching method and apparatus in which the vector inner product is used as a similarity measure.

Additionally, in the third embodiment, the case in which the vector index prepared by the vector index preparing apparatus of the first embodiment of the present invention is searched has been described. However, when the processing for obtaining each partial vector is only changed so as to obtain each component value from the norm division number and each component division number in the index preparing apparatus of the first embodiment, the similar vector searching apparatus of the third embodiment can also be used to search the vector index prepared by the vector index preparing apparatus of the second embodiment. Furthermore, effects similar to the aforementioned effects can be expected.

Furthermore, in the third embodiment, a procedure for successively performing the search processing on each partial space b in the first step of the similar vector search has been described. However, for the loop of steps 1306 to 1317 of the flowchart of FIGS. 8A and 8B, with a parallel computer having a large number of central processing units (CPUs), the processing is divided and processed by the respective CPUs, and intermediate results are accumulated in a common inner product difference table. In this case, the processing can easily be performed in parallel with a high parallelism, and the search speed can further be enhanced.

<Fourth Embodiment>

A fourth embodiment will next be described with reference to the drawings.

(Constitution of Similar Vector Searching Apparatus)

Figure 4:
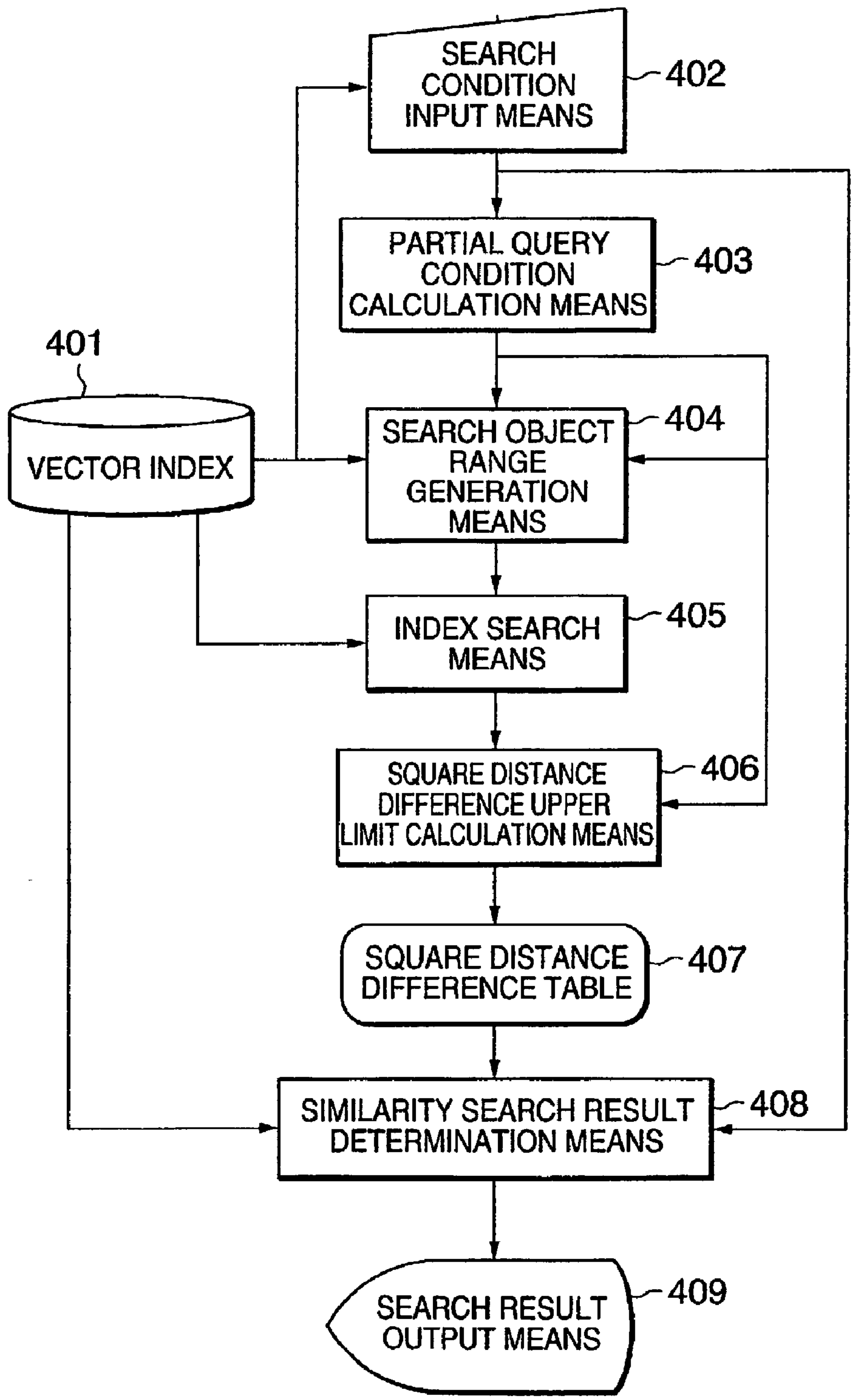
FIG. 4 is a block diagram showing the whole constitution of the similar vector searching apparatus in a fourth embodiment, FIGS. 5A and 5B constitute integrally a flowchart showing a preparing procedure of a first step of vector index preparation in the first and second embodiments, FIGS. 6A and 6B constitute integrally a flowchart showing the preparing procedure of second and third steps of the vector index preparation in the first embodiment, FIGS. 7A and 7B constitute integrally a flowchart showing the preparing procedure of the second and third steps of the vector index preparation in the second embodiment, FIGS. 8A and 8B constitute integrally a flowchart showing a search procedure of a first step of a similar vector search in the third embodiment.

FIG. 4 is a block diagram showing the whole constitution of the similar vector searching apparatus according to claims 10, 11, 13, 23, 24, 26 of the present invention. In FIG. 4, a vector index 401 is prepared by the vector index preparing apparatus of the aforementioned first embodiment, and is a vector index prepared from the vector database which stores 200,000 pieces of vector data constituted of two items of: the 296-dimensional real vector prepared from the newspaper article full text database of 200,000 collected newspaper articles and indicating the characteristic of each newspaper article; and the identification number of 1 to 200,000 for uniquely identifying each article and which has the content as shown in FIGS. 12A and 12B.

In order to perform the similarity search on the newspaper article full text database, search condition input means 402 inputs the identification number of any article in the newspaper article full text database, and the similarity lower limit value and maximum obtained pieces number of 0 to 100 indicating the similarity search range, searches the vector index 401 with the identification number to obtain the vector of the corresponding article as the query vector Q from the inputted identification number, and obtains a square distance from the similarity lower limit value, that is, obtains a square distance upper limit value $\alpha^2$ as the upper limit value of the squared distance.

Partial query condition calculation means 403 calculates a partial square distance upper limit value $f^2$ as the upper limit value of the square distance of 37 types of 8-dimensional partial query vectors q and the partial vector corresponding to q by $f^2=\alpha^2|q|^2/|Q|^2$ with respect to partial spaces of 0 to 36 for the query vector Q obtained by the search condition input means 402.

Search object range generation means 404 enumerates all sets (d, c, $[r_1, r_2]$) of the region number d for specifying a region including a partial vector whose partial square distance with the partial query vector q is possibly smaller than the partial square distance upper limit value $f^2$, declination division number c, and norm division range $[r_1, r_2]$ from the partial query vector q and partial square distance upper limit value $f^2$ obtained by the partial query condition calculation means 403 for the partial space b and the norm division table and declination division table in the vector index 401.

Index search means 405 calculates the search condition K for the vector index 401 from (d, c, $[r_1, r_2]$) generated by the search object range generation means 404 for each partial space b similarly as calculation of the key during the vector index preparation as follows.

$$K=[k_{min}, k_{max}]$$

$$k_{min}=b*7617440+d*1024+c*256+r_1$$

$$k_{max}=b*7617440+d*1024+c*256+r_2$$

The index search means then searches the range of the vector index 401 with the search condition K and obtains all sets (i, v) of the partial vector v and identification number i having the key to match the search condition.

Square distance difference upper limit calculation means 406 calculates a partial square distance difference value t from the set (i, v) of the partial vector v and identification number i obtained by the index search means 405 and the partial query vector q and partial square distance upper limit value $f^2$ obtained by the partial query condition calculation means 403 by $t=f^2|v-q|^2$, and accumulates (adds) the partial square distance difference value t to the table element S[i] having the identification number i as the affix. Thereby, the upper limit value of the square distance difference is calculated by subtracting a square distance $|V-Q|^2$ of the vector v of the vector data of the identification number i and the query vector Q from a square distance upper limit value $\alpha^2$.

A square distance difference table 407 accumulates the upper limit value of the square distance difference calculated by the square distance difference upper limit calculation means 406, and refers to/stores a square distance difference value S[i] of the vector data of the identification number i.

Similarity search result determination means 408 searches the vector index 401 with the identification number i in order from a positive large square distance difference upper limit value S[i] in the element S[i] of the square distance difference table 407 to obtain the corresponding vector V, calculates a square distance difference value $\alpha^2-|V-Q|^2$ by subtracting the square distance $|V-Q|^2$ of V and query vector Q calculated by the search condition input means 402 from the square distance upper limit value $\alpha^2$ calculated by the search condition input means 402, and replaces S[i] with the square distance difference value $\alpha^2-|V-Q|^2$. The number of articles which have the square distance difference values larger than the maximum value of the partial square distance difference accumulated value of the article having the square distance difference value not calculated and whose square distance difference value is calculated reaches L or more. At this time, or at the time the square distance difference values of all the articles having positive partial square distance difference accumulated values are calculated, for L result candidates at maxim (i, S[i]) having positive and large square distance difference values, a set (i, sqrt($\alpha^2$–S[i])) of the identification number i and distance sqrt($\alpha^2$–S[i]) is outputted as a search result to search result output means.

Search result output means 409 calculates and displays a similarity of the identification numbers of L newspaper articles at maximum to a range of 0 to 100 as a result of the similar vector search from the search result obtained by the similarity search result determination means 408.

(Operation of Similar Vector Searching Apparatus)

Figure 10A:
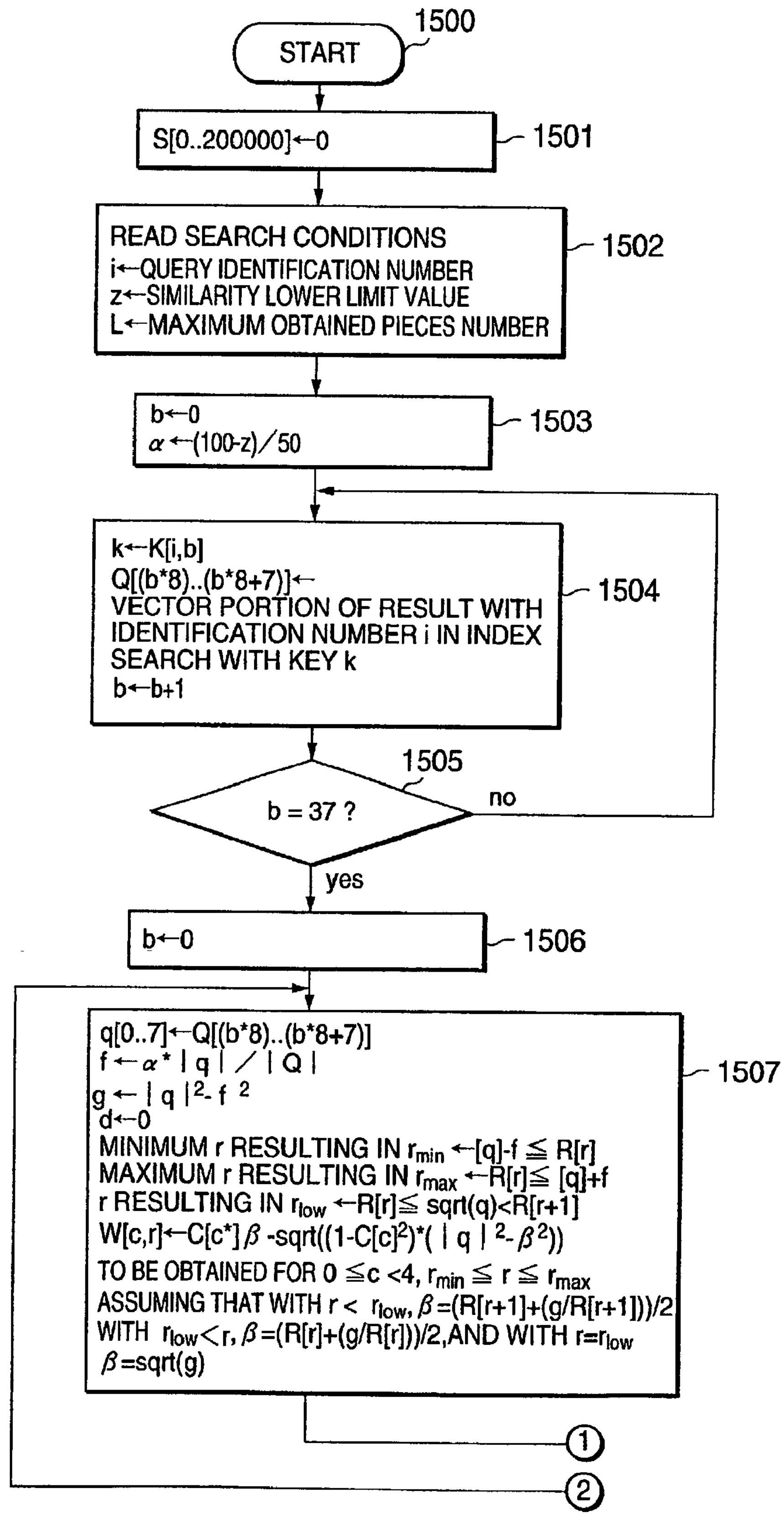
Figure 10B:
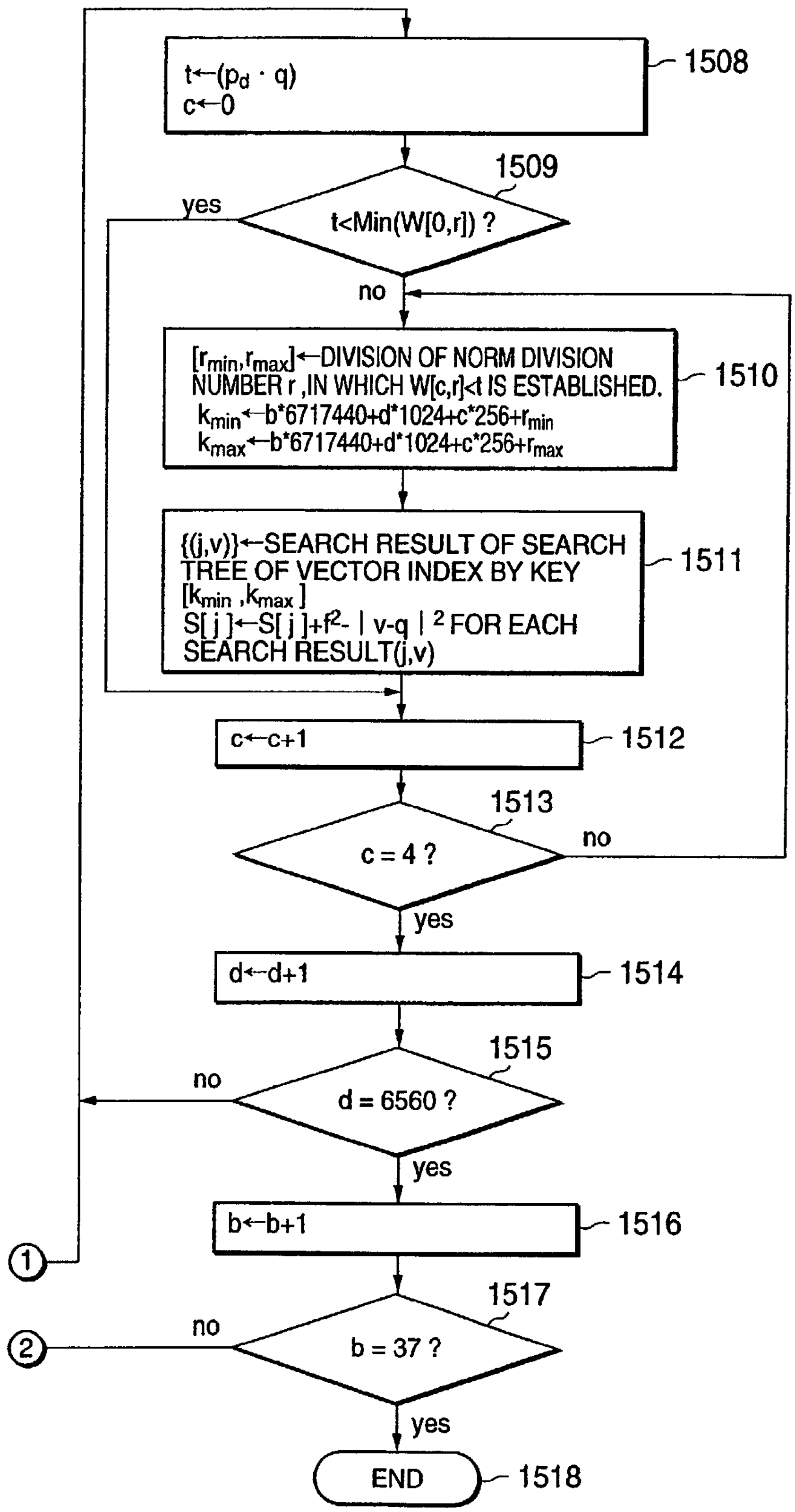

Operation of the similar vector searching apparatus constituted as described above will be described with reference to the drawings. FIGS. 10A and 10B constitute integrally a flowchart showing a search processing procedure in a first step of similar vector search, and FIGS. 11A and 11B constitute integrally a flowchart showing the search processing procedure in a second step of the similar vector search. In the first step of the similar vector search, the partial query vector q and partial square distance upper limit value f are prepared from the search condition inputted from the search condition input means 402, and the vector index 401 is searched. The square distance difference upper limit value S[i] of each vector data, that is, a value obtained by subtracting the square distance with the query vector from the square distance upper limit value is obtained such that the value is less than S[i] in the square distance difference table 407. Subsequently, in the second step of the similar vector search, the square distance difference upper limit value obtained in the square distance difference table 407 in the first step is used as a clue. The similarity search result determination means 408 searches the vector component and obtains the square distance difference in order from the vector data which meets a search condition "the square distance with the query vector is smaller than $\alpha^2$" and whose square distance with the query vector is relatively small. The determination means continues its processing until a designated number of (i.e., L) or more pieces of vector data guaranteed to be larger in square distance difference value than any vector data having the square distance difference not obtained yet are collected, or until the square distance difference values of all the vector data meeting the search condition are obtained. A distance is calculated from the obtained square distance difference value, and a final result is outputted.

(First Step of Similar Vector Search)

The content of the similar vector search will be described hereinafter with reference to FIGS. 10A, 10B, 11A and 11B by means of an example in which an identification number 1, similarity lower limit value 90, and maximum obtained pieces number 10 are inputted as the search conditions. Since the identification number is 1, the respective components of the 296-dimensional vector are obtained as shown in FIG. 12A. First in step 1501, 200,000 elements S[0] to S[200000] of a square distance difference table S are initialized/set to 0. Subsequently, the aforementioned search conditions are read from the search condition input means 402, and stored in i, Z, L, respectively.

After the partial space number b is initialized to 0 in step 1502, the square distance upper limit value $\alpha^2$ is calculated from the similarity lower limit value Z. This search condition results in $\alpha\leftarrow(100-90)/50=0.2$. In steps 1504, 1505, for each partial space, the inversion table K of the vector index 401 is used to obtain the key, the search table is searched to obtain the vector data, the vector portion of the data with the identification number of 1 is stored in Q, and thereby the query vector is obtained in Q[0 . . . 295]. After the partial space number is initialized in step 1506, the vector index is searched with respect to each partial space in steps 1507 to 1517 and the square distance difference upper limit value of each vector data is obtained in the square distance difference table 407.

In step 1507, partial query vector q[0 . . . 7] and partial square distance upper limit value $f^2$ of the partial space number b are obtained, that is, the upper limit value of the partial square distance of the partial space partial vector data v and q is obtained. With b=0, $|q|^2=0.221795$, $|Q|^2=1$, then the following results.

$$f^2=0.04*0.221795/1.0=0.0088718$$

After the region number d is initialized to indicate 0, the table W for use in determining the search object range is prepared. When the table W is referred to with the declination division number c and norm division number r, and the inner product p·q of the center vector p of the noted region with the region number d with the partial query vector q is less than W[c, r], the table is prepared in such a manner that the partial square distance of the partial vector v and partial query vector q of divisions (d, c, 0) to (d, c, r) is $f^2$ or more. In this case, the partial vector of divisions (d, c, 0) to (d, c, r) does not satisfy the search condition (i.e., the partial square distance is larger than $f^2$) for the partial space, the search of these divisions can be omitted.

In order to obtain the table W, with the partial v closest to the partial query vector q in the region d, the case may be considered in which p, q, v are on one plane and angle ω formed by v and q is smallest in the range of declination division c. In this case, assuming that the angle formed by p and q is θ and that the maximum value of the angle formed by p and v is ϕ, the angle ω formed by v and q is ω=θ−ϕ and the following relations are therefore used.

$$f^2>|v-q|^2=|v|^2+|q|^2-2*|v|*|q|*\cos(\theta-\phi)>R[r]^2+|q|^2-2*R[r+1]*|q|*(\cos\theta*\cos\phi+\sin\theta\sin\phi)$$

$$C[c]=\cos\phi$$

$$\cos\theta=(p\cdot q)/|p|*|q|=(p\cdot q)/|q|$$

From the above, the following inequality satisfied by p·q is solved, and formula W[c, r] of step 1507 is obtained.

$$f^2 < R[r]^2 + |q|^2 - 2*R[r+1]*((p\cdot q)*C[c] + \mathrm{sqrt}(|q|^2 - (p\cdot q)^2) *\mathrm{sqrt}(1 - C[c]^2))$$

In this manner, the value of the table W[c, r] can be determined only from the norm |q| of the partial query vector without referring to the actual components of partial vector v or depending on the region d. In the present embodiment, since the norm division table R and declination division table C are as shown in FIGS. 15A, 15B and 16, with b=0, b=1, the table W has a content as shown in FIGS. 18A, 18B and 18C. Similarly as FIGS. 17A and 17B, the drawings mean that for the element with the table value of "9.99999", the norm division is not a search object for the partial query vector q. Moreover, with b=0 the table values of divisions 10 to 255 are not described. With b=1 the table values of divisions 0 to 59 and 180 to 255 are not described. Because all these parts have the value "9.9999" and the value is therefore omitted. In this case, since the distance is used as the similarity measure, even with too small, or conversely too large norm, the distance from the partial query vector is enlarged. As a result, the search condition "the distance is less than α" cannot be satisfied.

In step 1508, the inner product t of the region center vector p of the noted region with the partial query vector q is obtained, and the loop variable c for declination division is initialized to indicate 0. Subsequently, it is checked in step 1509 whether or not the inner product t is smaller than that of element Min(W[0, r] indicating the minimum value of the table W. When the inner product is smaller, it is defined that any partial vector using the region d as part of the key does not satisfy the search condition. Therefore, the flow jumps to step 1512. If not so, in step 1510 for the declination division c, a minimum value $r_{min}$ and maximum value $r_{max}$ of the norm division to be searched are obtained as the division of the norm division number r, in which W[c, r] is established, with the aid of the table W calculated in the step 1507. A search range [$k_{min}$, $k_{max}$] of the vector index 401 is obtained from this [$r_{min}$, $r_{max}$], partial space number b, region number d, and declination division number c.

In step 1511, this search range [kmin, kmax] is used as the key to search the range of the search tree, and the partial square distance difference value is calculated by subtracting the partial square distance $|v-q|^2$ of the partial query vectors q and v from the partial square distance upper limit value $f^2$ for respective sets (j, v) of the identification number j and vector v included in the range search result, and is accumulated in the corresponding element S[j] of the square distance difference table 407.

For example, with b=0, d=4212, $$q=(+0.029259\ \ -0.016005\ \ -0.021118\ \ +0.024992\ \ -0.006860\ \ -0.009032\ \ -0.007255\ \ -0.007715),$$

and $$p=(+1/2, -1/2, -1/2, +1/2, 0, 0, 0, 0),$$

then the following results:

$$t=p\cdot q+0.045687.$$

Since t is larger than Min(W[0, r])=0.03356, the flow advances to step 1510. From the table W of FIGS. 15A and 15B, for example, with c=0, $$r_{min}=1,\ r_{max}=5.$$

The search range of the search tree is as follows:

$$[kmin,\ kmax]=[0*6717440+4212*1024+0*256+1,\ 0*6717440+4212*1024+0*256+255]=[4313089,\ 4313093].$$

Since the partial vector x with b=0 of the vector data with the identification number 1 is $$x=(+0.029259\ \ -0.016005\ \ -0.021118\ \ +0.024992\ \ -0.006860\ \ -0.009032\ \ -0.007255\ \ -0.007715),$$

and is registered with k=0*6717440+4212*1024+0*256+1=4313089, the vector is one of the range search results. The partial square distance difference value is:

$$f_2-|v-q|_2=0.0088718-0=0.0088718.$$

Then, S[1]=0.0088718.

In this manner, in steps 1512, 1513, while c is increased, the search range determination and search processing, and the calculation and accumulation of the square distance difference are performed for each declination division. Subsequently, in steps 1514 and 1515 while the region number d is successively increased to 6560, each region is subjected to a processing of steps 1508 to 1513. Furthermore, in steps 1516 and 1517 while the partial space number is successively increased to 37, each partial space is subjected to a processing of steps 1507 to 1515, and the first step of the similar vector search is finished. In this stage, in the square distance difference table 407, for the vector data V with each identification number, an upper limit of an estimated value of a square distance difference value $\alpha^2-|V-Q|^2$ as a difference between the square distance upper limit value $\alpha^2$ and the square distance $|V-Q|^2$ with the query vector Q is obtained. Because in the respective partial spaces b, for the partial vector whose square distance with the partial query vector q is smaller than the partial square distance upper limit value $f^2$, the partial square distance difference value is obtained without exception. Therefore, the partial square distance difference value of the vector data whose partial square distance difference value is not obtained must indicate a negative value. This negative value is replaced with 0 and accumulated ("the square distance difference table is not changed" is equivalent to accumulation of 0), and therefore the accumulation result of the partial square distance difference value is one of the square distance difference upper limit values which press the square distance difference value from above. After the square distance difference table 407 is obtained as described above, a second step of the similar vector search is executed, and the final search result is obtained.

(Second Step of Similar Vector Search)

Figure 11A:
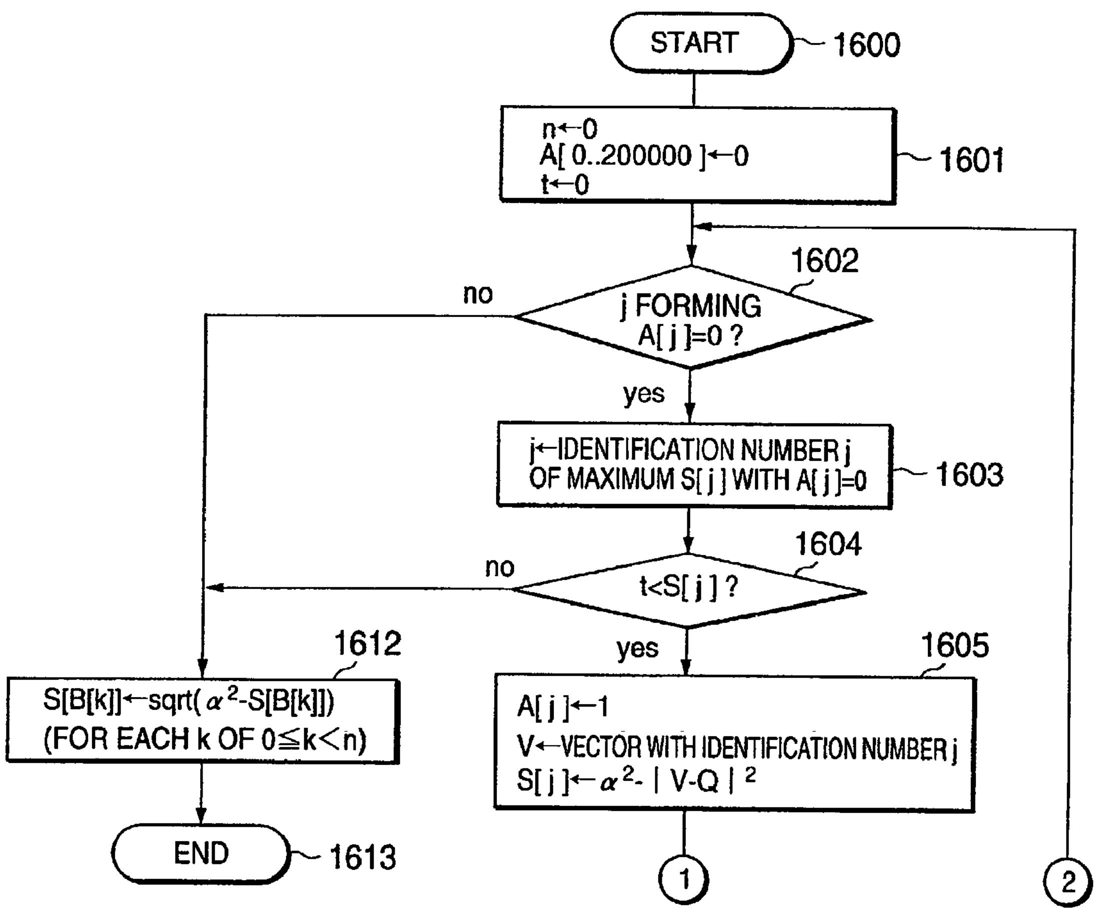
Figure 11B:
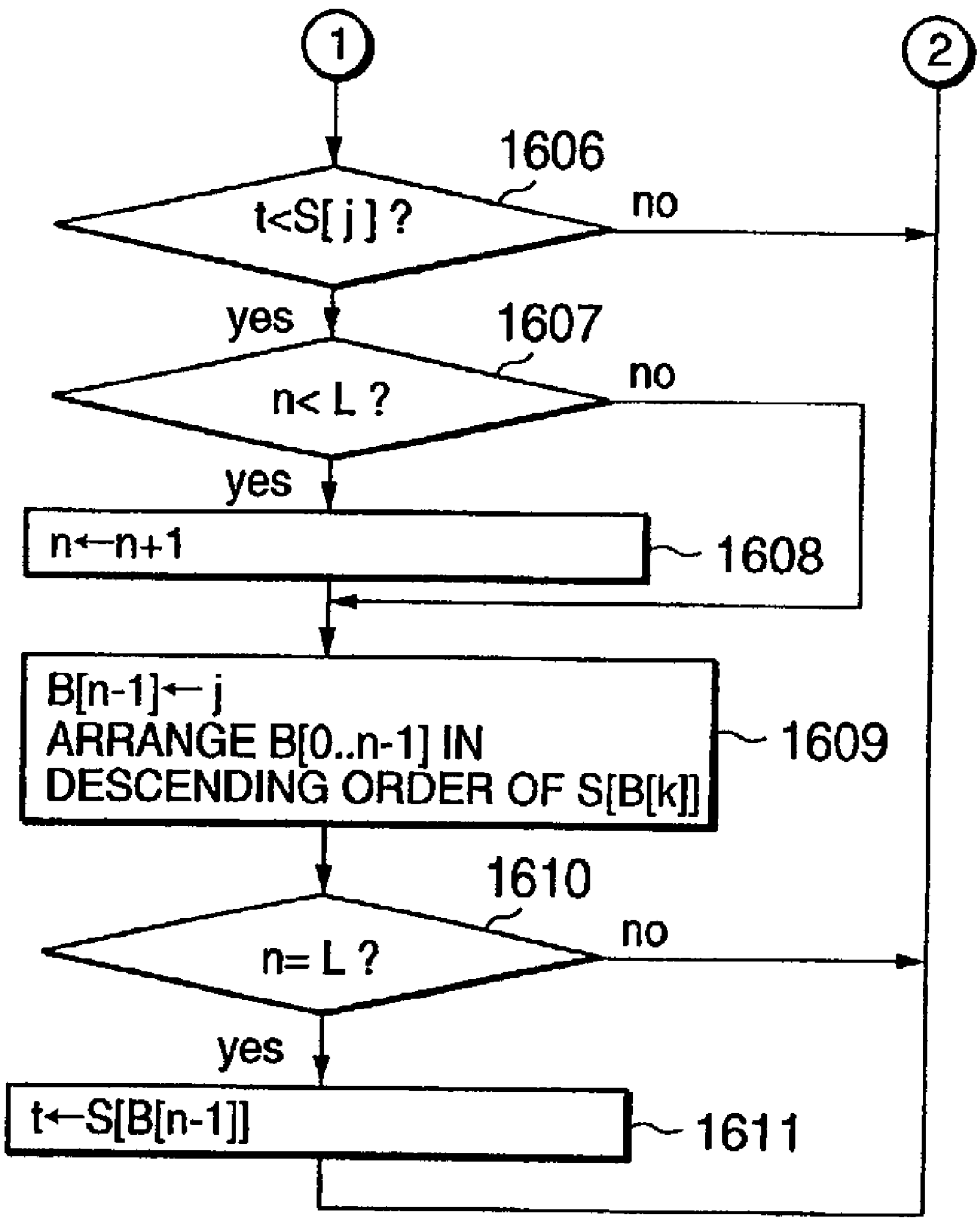

A processing procedure of the second step will next be described with reference to the flowchart of FIGS. 11A and 11B. In step 1601 the number of candidates satisfying the search conditions of the present time is cleared to indicate 0, and a flag A[0 . . . 200000] indicating whether or not the square distance difference of the vector data is obtained is initialized/set to 0, that is, "no square distance difference is obtained". Moreover, the minimum value (=threshold value) t of the square distance difference value among the candidates satisfying the search conditions at the present time is initialized to indicate 0.

It is checked in step 1602 whether there is non-inspected vector data, that is, vector data with the non-obtained square distance difference. When the square distance differences of all the vector data are obtained, the flow jumps to step 1612. Additionally, when the square distance upper limit value given as the search condition is 1 or less, and when a deviation in the distribution of the respective components of the vector data is small, condition indicates "no" in the step 1604 far before obtaining the square distance differences of all the vector data. Therefore, "no" does not result from the step 1602 under the usual search conditions. In step 1603 obtained is the identification number j of the vector data in which A[j] is 0, that is, value S[j] of the square distance difference table is maximized in the non-inspected vector data. The processing of this step can efficiently be executed by arranging the square distance difference table 407 in the descending order of the square distance difference value or by representing the table by data structures such as heap.

In step 1604, the previously obtained t is compared with S[j]. If S[j] is t or less, it is defined that no vector data exceeding the square distance difference values of n candidates of the present time exists in the non-inspected vector data. Therefore, the flow jumps to step 1612 to calculate the result from the candidates of the present time, and finish the search processing.

When t is larger than S[j], in the step 1605 the flag A[j] of the noted vector data is changed to 1, it is recorded "the square distance difference is obtained", and the vector index 401 is searched to obtain the vector V with the identification number j. Moreover, the square distance difference value $\alpha^2-|V-Q|^2$ with the query vector V is obtained, and the upper limit value in the corresponding element S[j] of the square distance difference table 407 is replaced with a correct square distance difference value. When there is an allowance in the storage region, the square distance difference table may be recorded in a new table without being replaced. In step 1606, the replaced S[j] is again compared with t. When S[j] is larger than t, steps 1607 to 1611 are executed and the vector data with the identification number j is added to the candidates.

It is judged in the step 1607 whether L candidates are already obtained at this time. When the L candidates are not obtained, the number n of candidates is increased in the step 1608. In the step 1609, after j is registered as the final candidate (candidate lowest in square distance difference among the candidates) of arrangement B of the candidate identification numbers, B[0 . . . n-1] is arranged in the descending order of S[B[k]]. When the candidate number n reaches L in the step 1610, the threshold value t is updated in the step 1611, and the flow returns to the step 1602 to continue the processing. If judgment is "no" in the step 1602 or 1604, the flow goes out of the aforementioned loop and advances to step 1612.

In the step 1612, the distance with the query vector Q is obtained from the already obtained square distance difference value S[B[k]] by sqrt($\alpha^2$−S[B[k]]) with respect to each of n (L at maximum) candidate identification numbers B[0] to B[n-1]. For each k of 0 to n-1, a set (B[k], S[B[k]]) of a result number B[k] of the vector data having k-th small distance, and the value S[B[k]] of the distance with the query vector Q is outputted as the final result of the similar vector search, and the similar vector search is finished.

When the value of the square distance upper limit $\alpha^2$ in the search conditions is 0.5 or less and sufficiently small, there is no large deviation in the vector data distribution, and the number of pieces of vector data having the square distance less than the square distance upper limit $\alpha^2$ is sufficiently larger than the obtained pieces number L, the loop of the steps 1602 to 1611 is repeated about several times the obtained pieces number L. In this case, the judgment of the step 1604 is "no", the number of pieces of vector data for actually searching the vector to obtain the square distance is very small, and it is possible to efficiently obtain the final result. Additionally, this characteristic is established even when L indicates about several hundreds. Therefore, in the search conditions with a relatively large L, the processing efficiency is remarkably enhanced as compared with the conventional similar vector searching method in which the practical search speed can be obtained only with L indicating several pieces at most.

As described above, according to the similar vector searching method of the fourth embodiment of the present invention, for the vector database of a large number of pieces of collected vector data with the vector of several hundreds of dimensions, the high-speed similarity search of the type "most similar L pieces of vector data are obtained" is possible. Furthermore, even when L is relatively large (several tens to several hundreds), the search processing is not excessively delayed. The similarity search range such as "distance value of 0.2 or less" can be designated. There can be provided the superior similar vector searching method in which the distance between the vectors is used as the similarity measure.

Additionally, in the fourth embodiment, the case in which the vector index prepared by the vector index preparing apparatus of the first embodiment of the present invention is searched has been described. However, when the processing for obtaining each partial vector is only changed so as to obtain each component value from the norm division number and each component division number in the index preparing apparatus of the first embodiment, the similar vector searching apparatus of the fourth embodiment can also be used to search the vector index prepared by the vector index preparing apparatus of the second embodiment. Furthermore, the effects similar to the aforementioned effects can be expected.

Moreover, in the fourth embodiment, a mode in which the query vector is not directly inputted, and the identification number of the vector data in the vector database is designated has been described. However, even when the query vector data is directly designated from the outside, the similar vector searching apparatus can easily be implemented in the similar method as described above.

Furthermore, in the fourth embodiment, a procedure for successively performing the search processing on each partial space b in the first step of the similar vector search has been described. However, for the loop of steps 1506 to 1517 of the flowchart of FIGS. 10A and 10B, with the parallel computer having a large number of central processing units (CPUs), the processing is divided and processed by the respective CPUs, and the intermediate results are accumulated in the common inner product difference table. In this case, the processing can easily be performed in parallel with a high parallelism, and the search speed can further be enhanced.

Possibility of Industrial Utilization

As described above, according to the present invention, there is provided a vector index preparing method comprising: partial vector calculation means; norm distribution tabulation means; norm division table; region number calculation means; declination distribution tabulation means; declination division table; norm division number calculation means; declination division number calculation means; index data calculation means; and index constituting means. Thereby, even when a vector is of several hundreds of dimensions, a high-speed search is possible with respect to a vector database having unclear direction and norm distribution. During similarity searching, either one of two types of similarities of a distance between vectors and a vector inner product can be selected. The similarity search of a type such that "most similar L vectors are obtained" can be performed. Furthermore, even when L is relatively large (several tens to several hundreds), a search processing is not excessively delayed. A similarity search range such as "inner product of 0.6 or more" can be designated. Additionally, a calculation amount required for index preparation is in a practical range. Such vector index can effectively be prepared.

Moreover, when the vector index preparing method of the present invention further comprises component division number calculation means, in addition to the aforementioned effect, an effect is produced that a calculation error by quantization of a component is minimized and a capacity of the vector index to be prepared can remarkably be reduced.

Furthermore, according to of the present invention, there is provided a similar vector searching method comprising: partial query condition calculation means; search object range generation means; index search means; inner product difference upper limit calculation means or square distance difference upper limit calculation means; and similarity search result determination means. An accumulated value of a partial inner product difference is calculated and used as a clue to a similarity search. Thereby, even when the vector is of several hundreds of dimensions, a high-speed search is possible with respect to a vector database. The similarity search of the type such that "most similar L vectors are obtained" can be performed. Furthermore, even when L is relatively large (several tens to several hundreds), a search processing is not excessively delayed. A similarity search range such as "inner product of 0.6 or more" can be designated. Additionally, a similar vector search using the inner product or a distance as a similarity measure is effectively enabled. Additionally, it is unnecessary to designate that the inner product or the distance be used as the similarity measure during the vector index preparation. A superior effect is therefore produced that single vector index can be used to selectively use the similarity measure as occasion demands during searching.

Moreover, according to the present invention, there is provided a similar vector searching method comprising: means for calculating a partial query condition; means for generating a search object range; means for searching an index; means for calculating a square distance difference upper limit; and means for determining a similarity search result. An accumulated value of a partial square distance difference is calculated and used as a clue to the similarity search. Thereby, even when the vector is of several hundreds of dimensions, a high-speed search is possible with respect to the vector database. The similarity search of the type such that "most similar L vectors are obtained" can be performed. Furthermore, even when L is relatively large (several tens to several hundreds), the search processing is not excessively delayed. The similarity search range such as "inner product of 0.8 or less" can be designated. Additionally, the similar vector search using a distance as the similarity measure is effectively enabled.

When the vector data constituting an index preparation object or a search object is high-dimensional and is of several hundreds of dimensions, the number of pieces of vector data in the vector database is as large as several tens to several hundreds of pieces, and the number of obtained pieces during searching is as many as several tens of pieces, the effect of the present invention are particularly remarkable. In the conventional vector index preparing method, several hundreds of hours are required as an index preparation time, but the time can be reduced to several tens of minutes. Moreover, the similarity search processing, which has required several minutes or which has been impracticable in the conventional similar vector searching method, can be performed for one second or less. Such very large effects can practically be obtained.

The invention claimed is:

1. A method of preparing an index, which is searchable by a computer, with respect to a vector database in which a finite number of ordered lists each including at least N-dimensional real vector and an identification number of the vector are registered as vector data, said index being used for data retrieval using a computer, said method comprising:

a first step of vector index preparation of dividing N components into m ordered list in a predetermined method with respect to the N-dimensional real vector V of each vector data in said vector database, preparing m partial vectors $v_1$ to $v_m$, subsequently tabulating a distribution of a norm of the partial vector $v_k$ (k=1 to m), preparing a norm partition table which contains a predetermined number of norm ranges, calculating a region number d to which said partial vector $v_k$ belongs in accordance with predetermined D region center vectors $p_1$ to $p_D$, tabulating a distribution of a cosine $(v_k \cdot p_d)/(|V_k|*|p_d|)$ of an angle formed by said partial vector $v_k$ and the region center vector $p_d$ as a declination distribution, and preparing a declination partition table which contains a predetermined number of declination ranges;

a second step of the vector index preparation of dividing N components into m ordered lists in the same method as said first step with respect to the N-dimensional real vector V of each vector data in said vector database, preparing m partial vectors $v_1$ to $v_m$, referring to said norm partition table to calculate a number r of the norm partition to which the norm of said partial vector $v_b$ belongs with respect to the partial vector $v_b$ (b=1 to m) for the partial space number b, calculating the region number d to which said partial vector $v_b$ belongs in accordance with the predetermined D region center vectors $p_1$ to $p_D$ in the same method as said first step, calculating a declination $(v_b \cdot p_d)/(|v_b|*|p_d|)$ as a cosine of an angle formed by said partial vector $v_b$ and the region center vector $p_d$ indicating a center direction of the region of said region number d, referring to said declination partition table, calculating a number c of the belonging declination partition, and calculating index registration data to be registered in a vector index from said partial space number b, said region number d, said declination partition number c, said norm partition number r, the component of said partial vector $v_b$, and the identification number i; and a third step of the vector index preparation of constituting the vector index such that the identification number and the component of each partial vector can be searched using a ordered list of the partial space number b, the region number d, the declination partition number c and a norm partition number range $(r_1, r_2)$ as a key from said norm partition table, said declination partition table, and said index registration data, and such that the vector component of each vector data can be searched with the identification number of the vector component.

2. A method of preparing an index, which is searchable by a computer, with respect to a vector database in which a finite number of ordered lists each including at least N-dimensional real vector and an identification number of the vector are registered as vector data, said index being used for data retrieval using a computer, said method comprising:

a first step of vector index preparation of dividing N components into m ordered list in a predetermined method with respect to the N-dimensional real vector V of each vector data in said vector database, preparing m partial vectors $v_1$ to $v_m$, subsequently tabulating a distribution of a norm of the partial vector $v_b$ (b=1 to m) for each partial space number b, preparing a norm partition table which contains a predetermined number of norm ranges, calculating a region number d to which said partial vector $v_b$ belongs in accordance with predetermined D region center vectors $p_1$ to $p_D$ tabulating a distribution of a cosine $(v_b \cdot p_d)/(|v_b|*|p_d|)$ of an angle formed by said partial vector $v_b$ and the region center vector $p_d$ as a declination distribution, and preparing a declination partition table which contains a predetermined number of norm ranges;

a second step of the vector index preparation of dividing N components into m ordered list in the same method as said first step with respect to the N-dimensional real vector V of each vector data in said vector database, preparing m partial vectors $v_1$ to $v_m$, referring to said norm partition table to calculate a number r of the norm partition to which the norm of said partial vector $v_b$ belongs with respect to the partial vector $v_b$ (b=1 to m) for said partial space b, calculating the region number d to which said partial vector $v_b$ belongs in accordance with the predetermined D region center vectors $p_1$ to $p_D$ in the same method as said first step, calculating a declination $(v_b \cdot p_d)/(|v_b|*|p_d|)$ as a cosine of an angle formed by said partial vector $v_b$ and the region center vector $p_d$ indicating a center direction of the region of said region number d, referring to said declination partition table, calculating a number c of the belonging declination partition, calculating a component partition number $w_j$ of a predetermined range to which $v_{bj}$ belongs from a maximum value of the norm of the norm partition corresponding to said calculated norm partition number r with respect to each component $v_{bj}$ of said calculated partial vector $v_b$, and calculating index registration data to be registered in a vector index from said partial space number b, said region number d, said declination partition number c, said norm partition number r, a string of said component partition numbers $w_j$, and the identification number i; and a third step of the vector index preparation of constituting the vector index such that the identification number and the component of each partial vector can be searched using a set of the partial space number b, the region number d, the declination partition number c and a norm partition number range $(r_1, r_2)$ as a key from said norm partition table, said declination partition table, and said index registration data, and such that the vector component of each vector data can be searched with the identification number of the vector component.

3. The vector index preparing method according to claim 1 or 2 wherein in the first and second steps of said vector index preparation, an angle cosine (vb·pd)/(|vb|*|pd|) is used as a function of an angle formed by the partial vector vb and the region center vector pd, and a value of the function is used as a declination to obtain the declination distribution.

4. The vector index preparing method according to claim 1 or 2 wherein in the first and second steps of said vector index preparation, N/m components or (N/m)+1 components are extracted in order from a top component of V so that all components of an N-dimensional vector V are extracted, and the partial vector is prepared.

5. The vector index preparing method according to claim 1 wherein in the first step of said vector index preparation, during preparation of the norm division table, the norm partition is determined based on the tabulation result of the norm distribution so that the number of partial vectors belonging to the norm range corresponding to each norm division becomes as uniform as possible.

6. The vector index preparing method according to claim 1 wherein in the first step of said vector index preparation, during preparation of the declination division table, the declination division is determined based on the tabulation result of the declination distribution so that the number of partial vectors belonging to the declination range corresponding to each declination division becomes as uniform as possible.

7. The vector index preparing method according to claim 1 or 2 wherein in the first and second steps of said vector index preparation, the region number of the partial vector $v_b$ is obtained as a number d of the region center vector $p_d$ in which a cosine $(v_b \cdot p_d)/(|v_b|*|p_d|)$ of an angle formed by $p_d$ and $v_b$ is largest among the predetermined D region center vector $p_1$ to $p_D$.

8. The vector index preparing method according to claim 1 or 2 wherein in the third step of said vector index preparation, a search tree in which a number (b*Nd*Nc*Nr) +(d*Nc*Nr)+(c*Nr)+r obtained by combining the partial space number b, the region number d, the declination division number c, and the norm division number r can be used as a key to search the identification number i and the component of the vector, and a table in which the vector data identification number is used as an affix and the key of said search tree of each partial vector is recorded are prepared and used as part of the vector index.

9. The vector index preparing method according to claim 1 or 2 wherein in the second step of said vector index preparation, the vector obtained by normalizing all vectors (0, . . . , 0, +1) to (−1, . . . , −1) whose component is any one of {−1, 0, +1} and which are not 0 vector is used as the region center vector.

10. A similarity vector searching method in which a query vector Q of an N-dimensional real vector, an inner product lower limit value α, and maximum obtained vector number L are designated as search conditions, a vector index prepared from vector data with a finite number of ordered list of at least N-dimensional real vector and an ID number of the real vector registered therein is searched, and L ordered list at maximum (i, V·Q) of an identification number i and an inner product of Q and V are obtained with respect to vector data (i, V) of said vector database whose value V·Q of the inner product with said query vector Q is larger than said inner product lower limit value α, said similar vector searching method comprising:

a first step of similar vector search of dividing N components of Q into m ordered lists in the same predetermined method as a method used in preparing said vector index with respect to said query vector Q, preparing m partial query vectors $q_l$ to $q_m$, calculating a partial inner product lower limit value $f_b$ as a lower limit value of a partial inner product of each partial query vector $q_b$ and the corresponding partial vector from a designated inner product lower limit value α, calculating a partial space number b, and an ordered list (c, $(r_1, r_2)$) of a declination division number c to be searched in a region number d and a norm partition range $(r_1, r_2)$ from a value of an inner product $p_d \cdot q_b$ of the region center vector $p_d$ and said partial query vector $q_b$, said partial inner product lower limit value $f_b$, and a norm partition table and a declination partition table in said vector index with respect to each partial query vector $q_b$ (b=1 to m) and each region b, searching a range of said vector index using (b, d, c, $(r_1, r_2)$) as a search condition based on said calculated (c, $(r_1, r_2)$), obtaining the identification number i and the component of the partial vector $v_b$ satisfying the condition as an index search result, calculating a partial inner product difference $(v_b \cdot q_b)-f_b$ as a difference between a partial inner product $v_b \cdot q_b$ of said $v_b$ and $q_b$ and said partial inner product lower limit value $f_b$, and accumulating (adding) the difference as an inner product difference upper limit value S(i) of the identification number i of an inner product difference table; and a second step of the similar vector search of searching said vector index with the identification number i in order from a largest value in said inner product difference table S(i) to obtain a vector data component V, calculating an inner product difference value $t=V\cdot Q-\alpha$ by subtracting a from the inner product V·Q of V and said query vector Q, and outputting an ordered list of at least the identification number i and an inner product $t+\alpha$ as a search result with respect to L pieces at maximum of vector data with a large inner product difference value when L or more pieces of vector data having the inner product difference value larger than a maximum value of an element having a non-calculated inner product difference value are collected, or when the inner products of all the vector data having a positive inner product difference upper limit value are calculated in said inner product difference table.

11. A similarity vector searching method in which a query vector Q of an N-dimensional real vector, a distance upper limit value $\alpha$, and maximum obtained vector number L are designated as search conditions, a vector index prepared from vector data with a finite number of ordered lists of at least N-dimensional real vector and an identification number of the real vector registered therein is searched, and L ordered lists at maximum (i, p) of an identification number i of an N-dimensional real vector V in said vector data and a distance p between Q and V are obtained such that a value of an inner product with said query vector Q is not more than said distance upper limit value $\alpha$, said similar vector searching method comprising:

a first step of similar vector search of dividing N components of Q into m ordered lists in the same predetermined method as a method used in preparing said vector index with respect to said query vector Q, preparing m partial query vectors $q_1$ to $q_m$, calculating a partial square distance upper limit value $f_b$ as an upper limit value of a partial square distance $|v_b-q_b|^2$ (i.e.,) corresponding to square of Euclidean distance of each partial query vector $q_b$ and the corresponding partial vector $v_b$ from a designated distance upper limit value $\alpha$, systematically generating an ordered list (b, d, c, $(r_1, r_2)$) of a partial space number b to be searched, a region number d, a declination partition number c and a norm partition range $(r_1, r_2)$ from said partial query vector $q_b$, said partial square distance upper limit value $f_b$, and a norm partition table and a declination partition table in said vector index with respect to each partial query vector $q_b$ (b=1 to m), searching a range of said vector index using said generated (b, d, c, $(r_1, r_2)$) as a search condition, obtaining the identification number i and the component of the partial vector $v_b$ satisfying the condition as an index search result, calculating a partial square distance difference $f_b-|v_b-q_b|^2$ as a difference between said partial square distance upper limit value $f_b$ and a partial square distance $|v_b-q_b|^2$ of $v_b$ and $q_b$, and accumulating (adding) the difference as a square distance difference upper limit value S(i) of the identification number i of a square distance difference table; and a second step of the similar vector search of searching said vector index with the identification number i in order from a largest value in said square distance difference table S(i) to obtain a vector data component V, calculating a square distance difference value $\alpha^2-|V-Q|^2$ by subtracting a square distance $|V-Q|^2$ of V and said query vector Q from a squared distance upper limit value $\alpha^2$, and outputting an ordered list of at least the identification number i and a distance $(\alpha^2-t)^{1/2}$ as a search result with respect to L pieces at maximum of vector data with a large square distance difference value t when L or more pieces of vector data having the square distance difference value larger than a maximum value of an element having a non-calculated square distance difference value are collected, or when the square distance difference values of all the vector data having a positive square distance difference upper limit value are calculated in said square distance difference table.

12. The similar vector searching method according to claim 10 or 11 wherein in the first step of said similar vector search, N/m components or (N/m)+1 components are extracted in order from a top component of V so that all components of an N-dimensional vector V are extracted, and the partial query vector is prepared.

13. The similar vector searching method according to claim 11 wherein in the first step of said similar vector search, the partial inner product lower limit value $f_b$ as the lower limit value of the inner product of said partial query vector $q_b$ and the corresponding partial vector $v_b$ is calculated from a designated inner product lower limit value $\alpha$ by $f_b=\alpha|q_b|^2/\Sigma(|q_b|^2)$.

14. The similar vector searching method according to claim 11 wherein in the first step of said similar vector search, the partial square distance upper limit value $f_b$ as the upper limit value of the square distance of said partial query vector $q_b$ and the corresponding partial vector $v_b$ is calculated from a designated distance lower/upper limit value $\alpha$ by $f_b=\alpha^2|q_b|^2/\Sigma(|q_b|^2)$.

15. An apparatus for preparing an index, which is searchable by a computer, with respect to a vector database in which a finite number of ordered lists each including at least N-dimensional real vector and an identification number of the vector are registered as vector data, said index being used for data retrieval using a computer, said apparatus comprising:

partial vector calculation means for dividing N components into m ordered lists in a predetermined method with respect to the N-dimensional real vector V of each vector data in said vector database, and preparing m partial vectors $v_1$ to $v_m$;

norm distribution tabulation means for tabulating a distribution of a norm of the partial vector $v_k$ (k=1 to m) among said prepared m partial vectors $v_1$ to $v_m$, and preparing a norm partition table which contains a predetermined number of norm ranges;

region number calculation means for calculating a region number d to which said partial vector $v_k$ belongs in accordance with predetermined D region center vectors $p_l$ to $p_D$;

declination distribution tabulation means for tabulating a distribution of a cosine $(v_k \cdot p_d)/(|V_k|*|p_d|)$ of an angle formed by said partial vector $v_k$ and the region center vector $p_d$ as a declination distribution, and preparing a declination partition table which contains a predetermined number of declination ranges;

norm division number calculation means for referring to said norm partition table to calculate a number r of the norm partition to which the norm of said partial vector $v_b$ belongs with respect to the partial vector $v_b$ (b=1 to m) for the partial space number b among the m partial vectors $v_1$ to $v_m$ prepared by said partial vector calculation means;

declination partition number calculation means for calculating a declination $(v_b \cdot p_d)/(|v_b|*|p_d|)$ as a cosine of an angle formed by said partial vector $v_b$ and the region center vector $p_d$ indicating a center direction of the region of said region number d calculated by said region number calculation means;

index data calculation means for calculating index registration data to be registered in a vector index from said partial space number b, said region number d, said declination partition number c, said norm partition number r, the component of said partial vector $v_b$, and the identification number i; and index constituting means for constituting the vector index such that the identification number and the component of each partial vector can be searched using an ordered list of the partial space number b, the region number d, the declination partition number c and a norm partition number range as a key from said norm partition table, said declination partition table, and said index registration data, and such that the vector component of each vector data can be searched with the identification number of the vector component.

16. An apparatus for preparing an index, which is searchable by a computer, with respect to a vector database in which a finite number of ordered lists each including at least N-dimensional real vector and an identification number of the vector are registered as vector data, said index being used for data retrieval using a computer, said apparatus comprising:

partial vector calculation means for dividing N components into m ordered lists in a predetermined method with respect to the N-dimensional real vector V of each vector data in said vector database, and preparing m partial vectors $v_1$ to $v_m$;

norm distribution tabulation means for tabulating a distribution of a norm of the partial vector $v_b$ (b=1 to m) for a partial space number b among said prepared m partial vectors $v_1$ to $v_m$, and preparing a norm partition table which contains a predetermined number of norm ranges;

region number calculation means for calculating a region number d to which said partial vector $v_b$ belongs in accordance with predetermined D region center vectors $p_1$ to $p_D$;

declination distribution tabulation means for tabulating a distribution of a cosine $(v_b \cdot p_d)/(|v_b|*|p_d|)$ of an angle formed by said partial vector $v_b$ and the region center vector $p_d$ as a declination distribution, and preparing a declination partition table which contains a predetermined number of declination ranges;

norm partition number calculation means for referring to said norm partition table to calculate a number r of the norm partition to which the norm of said partial vector $v_b$ belongs with respect to the partial vector $v_b$ (b=1 to m) for a partial space b among the m partial vectors $v_1$ to $v_m$ prepared by said partial vector calculation means;

declination partition number calculation means for calculating a declination $(v_b \cdot p_d)/(|v_b|*|p_d|)$ as a cosine of an angle formed by said partial vector $v_b$ and the region center vector $p_d$ indicating a center direction of the region of the region number d calculated by said region number calculation means;

component partition number calculation means for calculating a component partition number $w_j$ of a predetermined range to which $v_{bj}$ belongs from a maximum value of the norm of the norm partition corresponding to said calculated norm partition number r with respect to each component $v_{bj}$ of said calculated partial vector $v_b$;

index data calculation means for calculating index registration data to be registered in a vector index from said partial space number b, said region number d, said declination partition number c, said norm partition number r, a string of said component partition numbers $w_j$, and the identification number i; and index constituting means for constituting the vector index such that the identification number and the component of each partial vector can be searched using a ordered list of the partial space number b, the region number d, the declination partition number c and a norm partition number range $(r_1, r_2)$ as a key from said norm partition table, said declination partition table, and said index registration data, and such that the vector component of each vector data can be searched with the identification number of the vector component.

17. The vector index preparing apparatus according to claim 15 or 16 wherein said partial vector calculation means extracts N/m components or (N/m)+1 components in order from a top component of V so that all components of an N-dimensional vector V are extracted, and prepares the partial vector.

18. The vector index preparing apparatus according to claim 15 wherein during preparation of the norm division table said norm distribution tabulation means determines the norm division based on the tabulation result of the norm distribution so that the number of partial vectors belonging to the norm range corresponding to each norm division becomes as uniform as possible.

19. The vector index preparing apparatus according to claim 15 wherein during preparation of the declination division table, said declination distribution tabulation means determines the declination division based on the tabulation result of the declination distribution so that the number of partial vectors belonging to the declination range corresponding to each declination division becomes as uniform as possible.

20. The vector index preparing apparatus according to claim 15 or 16 wherein said region number calculation means obtains the region number of the partial vector $v_b$ as a number d of the region center vector $p_d$ in which a cosine $(v_b \cdot p_d)/(|v_b|*|p_d|)$ of an angle formed by $p_d$ and $v_b$ is largest among the predetermined D region center vector $p_1$ to $p_D$.

21. The vector index preparing apparatus according to claim 15 or 16 wherein said index constituting means prepares a search tree in which a number (b*Nd*Nc*Nr)+(d*Nc*Nr)+(c*Nr)+r obtained by combining the partial space number b, the region number d, the declination division number c, and the norm division number r can be used as a key to search the identification number i and the component of the vector, and a table in which the vector data identification number is used as an affix and the key of said search tree of each partial vector is recorded, and uses the search tree and the table as a part of the vector index.

22. The vector index preparing apparatus according to claim 15 or 16 wherein said region number calculation means uses the vector obtained by normalizing all vectors (0, . . . , 0, +1) to (−1, . . . , −1) whose component is any one of {−1, 0, +1} and which are not 0 vector as the region center vector.

23. A similarity vector searching apparatus for designating a query vector Q of an N-dimensional real vector, an inner product lower limit value $\alpha$, and maximum obtained vector number L as search conditions, searching a vector index prepared from vector data with a finite number of ordered lists of at least N-dimensional real vector and an ID number of the real vector registered therein, and obtaining L ordered lists at maximum (i, $V \cdot Q$) of an identification number i and an inner product of Q and V with respect to vector data (i, V) of said vector database whose value $V \cdot Q$ of the inner product with said query vector Q is larger than said inner product lower limit value $\alpha$, said similar vector searching apparatus comprising:

- partial query condition calculation means for dividing N components of Q into m ordered lists in the same predetermined method as a method used in preparing said vector index with respect to said query vector Q, preparing m partial query vectors $q_1$ to $q_m$, and calculating a partial inner product lower limit value $f_b$ as a lower limit value of a partial inner product of each partial query vector $q_b$ and the corresponding partial vector from a designated inner product lower limit value $\alpha$;
- search object range generation means for calculating a partial space number b, and an ordered list (c, ($r_1$, $r_2$)) of a declination partition number c to be searched in a region number d and a norm partition range ($r_1$, $r_2$) from a value of an inner product $p_d \cdot q_b$ of the region center vector $p_d$ and said partial query vector $q_b$, said partial inner product lower limit value $f_b$, and a norm partition table and a declination partition table in said vector index with respect to each partial query vector $q_b$ (b=1 to m) and each region b;
- index search means for searching a range of said vector index using (b, d, c, ($r_1$, $r_2$)) as a search condition based on (c, ($r_1$, $r_2$)) calculated by said search object range generation means, and obtaining the identification number i and the component of the partial vector $v_b$ satisfying the condition as an index search result;
- inner product difference upper limit calculation means for calculating a partial inner product difference $(v_b \cdot q_b) - f_b$ as a difference between a partial inner product $v_b \cdot q_b$ of said $v_b$ and $q_b$ and said partial inner product lower limit value $f_b$, and accumulating (adding) the difference as an inner product difference upper limit value S(i) of the identification number i of an inner product difference table; and
- similarity search result determination means for searching said vector index with the identification number i in order from a largest value in said inner product difference table S(i) to obtain a vector data component V, calculating an inner product difference value $t = V \cdot Q - \alpha$ by subtracting $\alpha$ from the inner product $V \cdot Q$ of V and said query vector Q, and outputting an ordered list of at least the identification number i and an inner product $t + \alpha$ as a search result with respect to L pieces at maximum of vector data with a large inner product difference value when L or more pieces of vector data having the inner product difference value larger than a maximum value of an element having a non-calculated inner product difference value are collected, or when the inner products of all the vector data having a positive inner product difference upper limit value are calculated in said inner product difference table.

24. A similarity vector searching apparatus for designating a query vector Q of an N-dimensional real vector, a distance upper limit value $\alpha$, and maximum obtained vector number L as search conditions, searching a vector index prepared from vector data with a finite number of ordered lists of at least N-dimensional real vector and an identification number of the real vector registered therein, and obtaining L ordered lists at maximum (i, p) of an identification number i of an N-dimensional real vector V in said vector data and a distance p between Q and V such that a value of an inner product with said query vector Q is not more than said distance upper limit value $\alpha$, said similar vector searching apparatus comprising:

- partial query condition calculation means for dividing N components of Q into m ordered lists in the same predetermined method as a method used in preparing said vector index with respect to said query vector Q, preparing m partial query vectors $q_1$ to $q_m$, calculating a partial square distance upper limit value $f_b$ as an upper limit value of a partial square distance $|v_b - q_b|^2$ (i.e.,) corresponding to square of Euclidean distance of each partial query vector $q_b$ and the corresponding partial vector $v_b$ from a designated distance upper limit value $\alpha$;
- search object range generation means for systematically generating an ordered list (b, d, c, ($r_1$, $r_2$)) of a partial space number b to be searched, a region number d, a declination partition number c and a norm partition range ($r_1$, $r_2$) from said partial query vector $q_b$, said partial square distance upper limit value $f_b$, and a norm partition table and a declination partition table in said vector index with respect to said partial query vector $q_b$ (b=1 to m);
- index search means for searching a range of said vector index using (b, d, c, ($r_1$, $r_2$)) generated by said search object range generation means as a search condition, and obtaining the identification number i and the component of the partial vector $v_b$ satisfying the condition as an index search result;
- square distance difference upper limit calculation means for calculating a partial square distance difference $f_b - |v_b - q_b|^2$ as a difference between said partial square distance upper limit value $f_b$ and a partial square distance $|v_b - q_b|^2$ of $v_b$ and $q_b$, and accumulating (adding) the difference as a square distance difference upper limit value S(i) of the identification number i of a square distance difference table; and
- similarity search result determination means for searching said vector index with the identification number i in order from a largest value in said square distance difference table S(i) to obtain a vector data component V, calculating a square distance difference value $\alpha^2 - |V - Q|^2$ by subtracting a square distance $|V - Q|^2$ of V and said query vector Q from a squared distance upper limit value $\alpha^2$, and outputting an ordered list of at least the identification number i and a distance $(\alpha^2 - t)^{1/2}$ as a search result with respect to L pieces at maximum of vector data with a large square distance difference value t when L or more pieces of vector data having the square distance difference value larger than a maximum value of an element having a non-calculated square distance difference value are collected, or when the square distance difference values of all the vector data having a positive square distance difference upper limit value are calculated in said square distance difference table.

25. The similar vector searching apparatus according to claim 23 or 24 wherein said partial query condition calculation means extracts N/m components or (N/m)+1 components in order from a top component of V so that all components of an N-dimensional vector V are extracted, and prepares the partial query vector.

26. The similar vector searching apparatus according to claim 23 wherein the partial inner product lower limit value $f_b$ as the lower limit value of the inner product of said partial query vector $q_b$, and the corresponding partial vector $v_b$ is calculated from a designated inner product lower limit value $\alpha$ by $f_b=\alpha|q_b|^2/\Sigma(|q_b|^2)$.

27. The similar vector searching apparatus according to claim 24 wherein the partial square distance upper limit value $f_b$ as the upper limit value of the square distance of said partial query vector $q_b$ and the corresponding partial vector $v_b$ is calculated from a designated distance lower/upper limit value $\alpha$ by $f_b=\alpha^2|q_b|^2/\Sigma(|q_b|^2)$.

28. A recording medium in which a computer program for executing the method of claim 1 or 2 is recorded.

29. A recording medium in which a computer program for realizing the apparatus of claim 15 or 16 by software is recorded.

* * * * *